(12) United States Patent
Rosson

(10) Patent No.: US 11,055,860 B2
(45) Date of Patent: Jul. 6, 2021

(54) VIDEO FRAME PROCESSING FOR MOTION COMPARISON

(71) Applicant: Praaktis Limited, Cobham (GB)

(72) Inventor: Paul Andrew Rosson, London (GB)

(73) Assignee: Praaktis Limited, Cobham (GB)

( * ) Notice: Subject to any disclaimer, the term of this patent is extended or adjusted under 35 U.S.C. 154(b) by 0 days.

(21) Appl. No.: 16/626,494

(22) PCT Filed: Jul. 13, 2017

(86) PCT No.: PCT/EP2017/067717
§ 371 (c)(1),
(2) Date: Dec. 24, 2019

(87) PCT Pub. No.: WO2018/108333
PCT Pub. Date: Jun. 21, 2018

(65) Prior Publication Data
US 2020/0167937 A1     May 28, 2020

(51) Int. Cl.
G06K 9/00      (2006.01)
G06T 7/269     (2017.01)
G06K 9/62      (2006.01)

(52) U.S. Cl.
CPC .......... G06T 7/269 (2017.01); G06K 9/00275 (2013.01); G06K 9/00335 (2013.01);
(Continued)

(58) Field of Classification Search
None
See application file for complete search history.

(56) References Cited

U.S. PATENT DOCUMENTS

2013/0182898 A1* 7/2013 Maeda .................... G06F 3/005
                                                              382/103

OTHER PUBLICATIONS

Alon J et al, "A Unified Framework for Gesture Recognition and Spatiotemporal Gesture Segmentation", IEEE Transactions on Pattern Analysis and Machine Intelligence, IEEE Computer Society, USA, Sep. 1, 2009), vol. 31, No. 9, pp. 1685-1699, doi:10.1109/TPAMI.2008.203, ISSN 0162-8828, XP011266649.
(Continued)

*Primary Examiner* — Soo Jin Park
(74) *Attorney, Agent, or Firm* — Nutter McClennen & Fish LLP

(57) ABSTRACT

A method is disclosed of processing a sequence of video frames showing motion of a subject to compare the motion of the subject with a reference motion. The method comprises storing at least one reference motion data frame defining a reference motion, each reference motion data frame corresponding to respective first and second reference video frames in a sequence of video frames showing the reference motion and comprising a plurality of optical flow vectors, each optical flow vector corresponding to a respective area segment defined in the first reference video frame and a corresponding area segment defined in the second reference video frame and defining optical flow between the area segment defined in the first reference video frame and the area segment defined in the second reference video frame. The method further comprises receiving a sequence of video frames to be processed. The method further comprises processing at least one pair of the received video frames to generate a motion data frame defining motion of a subject between the pair of received video frames. Each pair of received video frames that is processed is processed by, for each area segment of the reference video frames, determining a corresponding area segment in a first video frame of the pair and a corresponding area segment in a second video frame of the pair. Each of the pairs of received video frames is further processed by, for each determined pair of corresponding area segments, comparing the area segments and generating an optical flow vector defining optical flow between the area segments. Each of the pairs of received video frames is further processed by generating a motion data frame for the pair of received video frames, the motion data frame comprising the optical flow vectors generated for the determined pairs of corresponding area segments. The method further comprises comparing the at least one reference motion data frame defining the reference motion to the at least one generated motion data frames defining the motion of the subject and generating a similarity metric for the motion of the subject and the reference motion.

30 Claims, 18 Drawing Sheets

(52) U.S. Cl.
CPC ..... *G06K 9/00765* (2013.01); *G06K 9/00912* (2013.01); *G06K 9/6215* (2013.01); *G06T 2207/10016* (2013.01); *G06T 2207/30196* (2013.01)

(56) References Cited

OTHER PUBLICATIONS

"Cascade Classification", OpenCV 2.4.13.7 documentation » OpenCV API Reference » objdetect. Object Detection ». Jun. 6, 2017. Available at: http://docs.opencv.org/2.4/modules/objdetect/doc/cascade_classification.html (9 pages).

International Search Report and Written Opinion for Application No. PCT/EP2017/067717, dated Jun. 21, 2018 (11 pages).

Ivan Laptev et al, "Local Descriptors for Spatio-temporal Recognition", Spatial Coherence for Visual Motion Analysis Lecture Notes in Computer Science; LNCS, Springer, Berlin, DE, pp. 91-103, (Jan. 1, 2006), ISBN 978-3-540-32533-8, XP019028707.

"Lucas-Kanade method", Wikipedia, May 25, 2017. Available at: https://en.wikipedia.org/wiki/Lucas%E2%80%93Kanade_method (3 pages).

Somayeh Danafar et al: "Action Recognition for Surveillance Applications Using Optic Flow and SVM", Computer Vision—ACCV 2007; [Lecture Notes in Computer Science], Springer Berlin Heidelberg, Berlin, Heidelberg, p. 457-466, (Nov. 18, 2007), ISBN 978-3-540-76389-5, XP019082491.

\* cited by examiner

VIDEO FRAME PROCESSING FOR MOTION COMPARISON

CROSS-REFERENCE TO RELATED APPLICATIONS

This application is a national stage application of International Application No. PCT/EP2017/067717, filed Jul. 17, 2017, the entire contents of each of which is incorporated herein by reference.

TECHNICAL FIELD

The present invention relates to image processing and, more specifically, to processing a sequence of video frames showing motion of a subject to compare the motion of the subject with a reference motion.

BACKGROUND

Comparing a motion of a subject to a reference motion has a number of applications. For example, motion comparison can be used to assess whether a predetermined gesture has been performed, to evaluate a person's sports technique, such as a golf swing, or to provide feedback about an exercise routine, etc.

A number of motion capture and comparison techniques are known. In one technique, tracking markers are attached to a subject, and a sequence of video frames is recorded of the subject as the subject moves. In this technique, motion of the subject is tracked by detecting the positions of the tracking markers in the video frames, and comparing the detected positions of the tracking markers with reference positions defining a reference motion to determine if the motion of the subject matches or deviates from the reference motion.

In another known technique, multiple cameras are used to record a sequence of video frames of a subject from multiple directions, and the video frame data from the cameras is processed to determine a three-dimensional (3D) trajectory of the subject which is compared to a 3D reference trajectory.

Known motion capture and comparison techniques suffer from a number of technical problems, however. For example, for the tracking marker technique, tracking markers must be affixed to the subject, and the tracking markers must be visible throughout the recorded sequence of video frames. Accordingly, this technique is only applicable in certain scenarios. On the other hand, the multiple camera technique requires careful positioning of the multiple cameras and multiple sequences of video frames must be processed, making the processing that is required complex.

In addition, known techniques suffer from variations in accuracy which can be caused by changes in lighting conditions, parts of the subject being tracked becoming obscured and other factors.

The present invention aims to address one or more of the problems with known techniques.

SUMMARY

The present invention provides a method of processing a sequence of video frames showing motion of a subject to compare the motion of the subject with a reference motion. The method comprises storing at least one reference motion data frame defining a reference motion, each reference motion data frame corresponding to respective first and second reference video frames in a sequence of video frames showing the reference motion and comprising a plurality of optical flow vectors, each optical flow vector corresponding to a respective area segment defined in the first reference video frame and a corresponding area segment defined in the second reference video frame and defining optical flow between the area segment defined in the first reference video frame and the area segment defined in the second reference video frame. The method further comprises receiving a sequence of video frames to be processed. The method further comprises processing each of at least one pair of the received video frames to generate a motion data frame defining motion of a subject between the pair of received video frames. Each pairs of the received video frames that is processed is processed by, for each area segment of the reference video frames, determining a corresponding area segment in a first video frame of the pair and a corresponding area segment in a second video frame of the pair. Each of the pairs of received video frames is further processed by, for each determined pair of corresponding area segments, comparing the area segments and generating an optical flow vector defining optical flow between the area segments. Each of the pairs of received video frames is further processed by generating a motion data frame for the pair of received video frames, the motion data frame comprising the optical flow vectors generated for the determined pairs of corresponding area segments. The method further comprises comparing the at least one reference motion data frame defining the reference motion to the at least one generated motion data frames defining the motion of the subject and generating a similarity metric for the motion of the subject and the reference motion.

The present invention also provides a video frame processing apparatus configured to process a sequence of video frames showing motion of a subject to compare the motion of the subject with a reference motion. The video frame processing apparatus comprises a reference motion data frame store configured to store at least one reference motion data frame defining a reference motion, each reference motion data frame corresponding to respective first and second reference video frames and comprising a plurality of optical flow vectors, each optical flow vector corresponding to a respective area segment defined in the first reference video frame and a corresponding area segment defined in the second reference video frame and defining optical flow between the area segment defined in the first reference video frame and the area segment defined in the second reference video frame. The video frame processing apparatus further comprises a video data reception unit configured to receive a sequence of video frames to be processed. The video frame processing apparatus further comprises a motion data frame generation unit configured to process at least one pair of the received video frames to generate a motion data frame defining motion of a subject in between the pair of received video frames. The motion data frame generation unit is configured to process each pair of received video frames that is processed by, for each area segment of the reference video frames, determining a corresponding area segment in a first video frame of the pair and a corresponding area segment in a second video frame of the pair. The motion data frame generation unit is configured to further process each of the pairs of received video frames by, for each determined pair of corresponding area segments, comparing the area segments and generating an optical flow vector defining optical flow between the area segments. The motion data frame generation unit is configured to further process each of the pairs of received video frames by generating a motion data frame for the pair of received video frames, the motion data frame comprising the optical flow vectors generated for the determined pairs of corresponding area segments. The video frame processing apparatus further comprises a motion comparator configured to compare the at least one reference motion data frame defining the reference motion to the at least one generated motion data frame(s) defining the motion of the subject and generate a similarity metric for the motion of the subject and the reference motion.

The present invention also provides a non-transitory storage device storing program instructions which, when executed by a programmable processing apparatus, cause the processing apparatus to perform a method as set out above.

The present invention further provides a signal carrying program instructions which, when executed by a programmable processing apparatus, cause the processing apparatus to perform a method as set out above.

BRIEF DESCRIPTION OF THE DRAWINGS

Embodiments of the invention will now be described in detail, by way of example only, with reference to the accompanying figures, in which.

DETAILED DESCRIPTION

In the following, embodiments of the invention are described which process a sequence of video frames showing a human performing an exercise to compare the human's motion during the exercise with a reference motion derived by processing a sequence of reference video frames showing an expert carrying out the same exercise. However, it will be understood that the invention has wider applicability and that the subject need not be a human and also that the motion need not be an exercise. Accordingly, in the following description, the subject is also referred to variously as a user, a human, a person or an expert, in different contexts.

As will be explained in the following, rather than comparing the sequence of video frames showing the human performing the exercise with the sequence of video frames showing the expert performing the exercise, each sequence is processed to generate a respective sequence of motion data frames which characterise the motion, and these motion data frames are compared to generate a similarity metric defining the similarity of the human's motion during the exercise and the expert's motion during the exercise. This similarity metric can then be used in a number of different ways, for example to determine if the subject has correctly performed the exercise, etc.

Figure 1A:
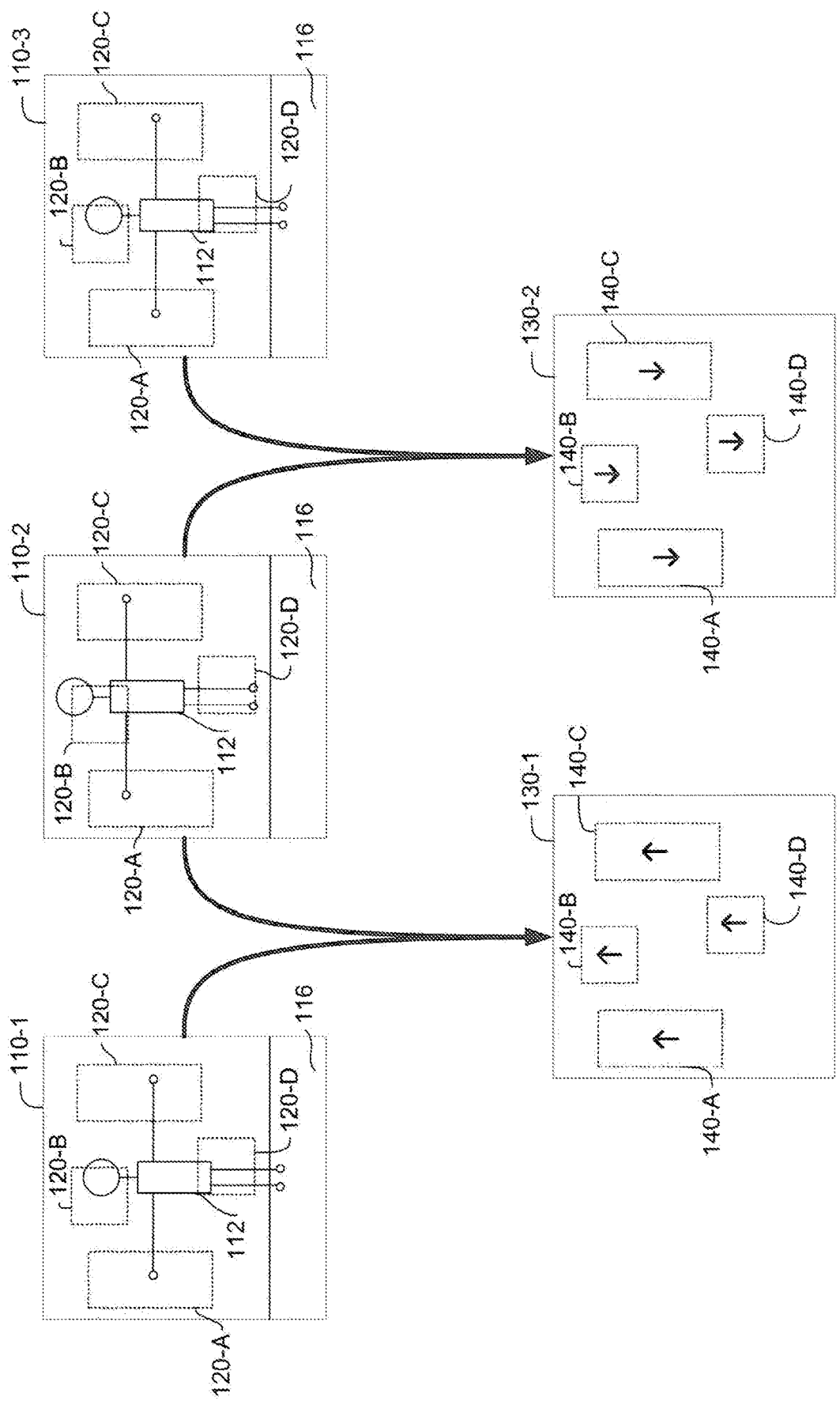
FIGS. 1A and 1B are schematic illustrations of video frames and corresponding motion data frames.

In more detail, referring to FIG. 1A, a schematic example is shown of a sequence of reference video frames 110-1, 110-2 and 110-3 in which an expert 112 performs a jump keeping his/her arms horizontal. Thus, the expert 112 is on the floor 116 in reference video frame 110-1, is in the air in reference video frame 110-2 and is on the floor 116 again in reference video frame 110-3. Although a sequence of only three reference video frames is illustrated in FIG. 1A for simplicity, it will be understood that a real-life sequence may contain many more reference video frames.

In each of the reference video frames 110-1, 110-2 and 110-3, area segments 120-A, 120-B, 120-C and 120-D are illustrated. These area segments are not actually present in the pixel information of the reference video frames, but are determined by a video frame processing apparatus in an embodiment when generating motion data frames, and are illustrated here for pedagogical purposes only. Although only four area segments are illustrated, it is possible to have any number comprising two or more area segments, with the granularity of motion comparison that is possible increasing as the number of area segments increases.

At the bottom of FIG. 1A, there is illustrated a sequence of reference motion data frames 130-1 and 130-2. As illustrated in FIG. 1A using arrows, a first pair of reference video frames 110-1 and 110-2 is processed to generate a first reference motion data frame 130-1, and a second pair of reference video frames 110-2 and 110-3 is processed to generate a second reference motion data frame 130-2.

Each reference motion data frame comprises optical flow vectors 140-A, 140-B, 140-C and 140-D. Each optical flow vector corresponds to a respective area segment in each of the pair of video frames and is generated by using optical flow analysis (as described in detail later) to compare the pixels in the area segment of the first reference video frame of the pair with the pixels in the corresponding area segment of the second reference video frame of the pair, so as to determine a direction and magnitude of motion that would be required by the pixels in order to transition from the pixels in the area segment of the first reference video frame to the pixels in the area segment of the second reference video frame. For example, in reference motion data frame 130-1, optical flow vector 140-A corresponds to, and is generated by comparing, the area segments 120-A in reference video frames 110-1 and 110-2. Similarly, in reference motion data frame 130-1, optical flow vector 140-B corresponds to, and is generated by comparing, the area segments 120-B in reference video frames 110-1 and 110-2. Similarly, in reference motion data frame 130-1, optical flow vector 140-C corresponds to, and is generated by comparing, the area segments 120-C in reference video frames 110-1 and 110-2. Similarly, in reference motion data frame 130-1, optical flow vector 140-D corresponds to, and is generated by comparing, the area segments 120-D in reference video frames 110-1 and 110-2. Likewise, in reference motion data frame 130-2, optical flow vector 140-A corresponds to, and is generated by comparing, the area segments 120-A in reference video frames 110-2 and 110-3. Similarly, in reference motion data frame 130-2, optical flow vector 140-B corresponds to, and is generated by comparing, the area segments 120-B in reference video frames 110-2 and 110-3. Similarly, in reference motion data frame 130-2, optical flow vector 140-C corresponds to, and is generated by comparing, the area segments 120-C in reference video frames 110-2 and 110-3. Similarly, in reference motion data frame 130-2, optical flow vector 140-D corresponds to, and is generated by comparing, the area segments 120-D in reference video frames 110-2 and 110-3.

Considering the "jump" motion shown in the reference video frames 110-1, 110-2 and 110-3 and the corresponding reference motion data frames 130-1 and 130-2, it can be seen that, for each of the area segments 120-A, 120-B, 120-C and 120-D, the portion of the expert 112 included in these area segments shifts upwards between reference video frame 110-1 and reference video frame 110-2, and shifts downwards between reference video frame 110-2 and reference video frame 110-3. Accordingly, the optical flow vectors 140-A, 140-B, 140-C and 140-D of reference motion data frame 130-1 each define upward motion, while the optical flow vectors 140-A, 140-B, 140-C, and 140-D of reference motion data frame 130-2 each define downward motion.

It should be noted that, while optical flow vectors are shown graphically by arrows in boxes in FIG. 1A, this is purely for teaching purposes and the optical flow vectors can be stored in any vector format. For example, each optical flow vector may be stored as a pair of values indicating magnitude and direction or indicating horizontal and vertical components.

Furthermore, it should be noted that each reference motion data frame does not need to store relative positions of the optical flow vectors within a two-dimensional frame layout, and the reference motion data frame can be any data structure suitable for storing optical flow vectors. However, in order to ensure that the optical flow vectors defining the motion of the expert in the reference video frames can be compared to optical flow vectors representing motion of a person attempting to perform the same motion, the optical flow vectors of each reference motion data frame should be stored as an ordered list, or some other appropriate indexing or labelling of the optical flow vectors should be used.

Figure 1B:
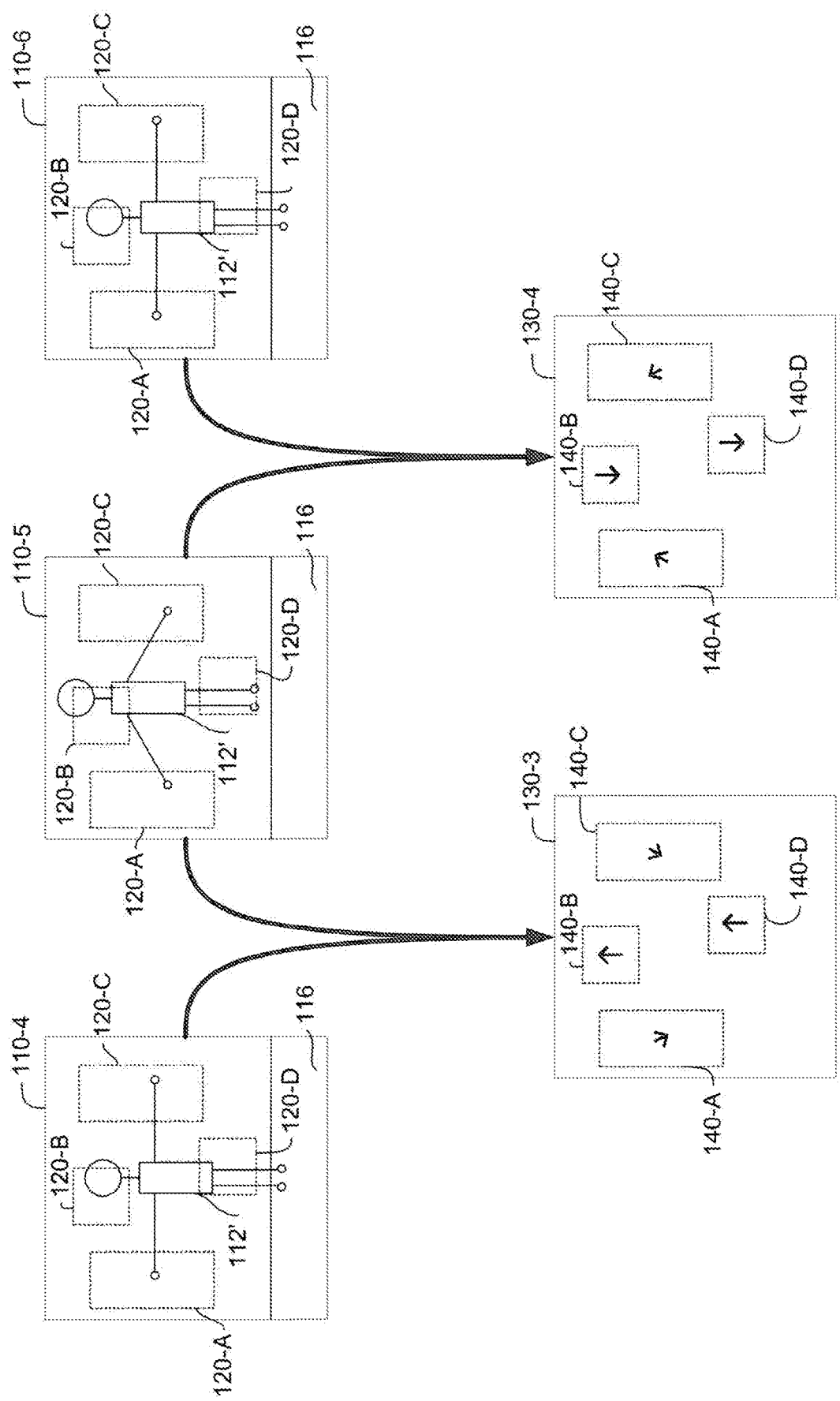

Referring now to FIG. 1B, a schematic example is shown of a sequence of video frames 110-4, 110-5 and 110-6 in which a human subject 112' attempts to imitate the expert motion shown in FIG. 1A, by performing a jump keeping his/her arms horizontal. Thus, the human 112' is on a floor 116 in video frame 110-4, is in the air in video frame 110-5 and is on the floor 116 again in video frame 110-6. However, while the arms of expert 112 remain horizontal throughout the expert motion, the arms of human 112' are lowered in video frame 110-5.

Although a sequence of only three video frames is illustrated in FIG. 1B for simplicity, it will be understood that a real-life sequence may contain many more video frames.

In each of the video frames 110-4, 110-5 and 110-6, area segments 120-A, 120-B, 120-C and 120-D are illustrated. The area segments in video frames 110-4, 110-5 and 110-6 are defined so that there is a corresponding area segment for each area segment in the reference video frames 110-1, 110-2 and 110-3. This correspondence is indicated by using the same reference number for corresponding area segments; so area segment 120-A in the video frames 110-4, 110-5 and 110-6 corresponds to area segment 120-A in the reference video frames 110-1, 110-2 and 110-3, etc.

At the bottom of FIG. 1B, there is illustrated a sequence of generated motion data frames 130-3 and 130-4. As illustrated in FIG. 1B using arrows, a first pair of video frames 110-4 and 110-5 is processed to generate a first generated motion data frame 130-3, and a second pair of video frames 110-5 and 110-6 is processed to generate a second generated motion data frame 130-4.

Each motion data frame comprises optical flow vectors 140-A, 140-B, 140-C and 140-D (there being a respective optical flow vector for each area segment in the video frames). The optical flow vectors of FIG. 1B are generated in the same way as the optical flow vectors of FIG. 1A. As this processing has been previously described for FIG. 1A, it will not be repeated here for conciseness.

Considering the "jump" motion shown in the video frames 110-4, 110-5 and 110-6 and the corresponding generated motion data frames 130-3 and 130-4, it can be seen that, for the area segments 120-B and 120-D, the portion of the human 112' included in these area segments shifts upwards between video frame 110-4 and video frame 110-5, and shifts downwards between video frame 110-5 and video frame 110-6. Accordingly, the optical flow vectors 140-B and 140-D of generated motion data frame 130-3 each show upward motion, while the optical flow vectors 140-B and 140-D of generated motion data frame 130-4 each show downward motion. Therefore, comparing the motion vectors for only area segments 120-B and 120-D in generated motion data frame 130-3 with the motion vectors for the corresponding area segments 120-B and 120-D in reference motion data frame 130-1, and comparing motion vectors for area segments 140-B and 140-D in generated motion data frame 130-4 with the motion vectors for the corresponding area segments 140-B and 140-D in reference motion data frame 130-2, the motion of human 112' is the same as the motion of the expert 112 in these area segments.

However, it can also be seen that, for the area segments 120-A and 120-C, the hand and lower arm portions of human 112' included in these area segments shift downwards between video frame 110-4 and video frame 110-5, and shift upwards between video frame 110-5 and video frame 110-6. Accordingly, the optical flow vectors 140-A and 140-C of generated motion data frame 130-3 each show a small downward motion, while the optical flow vectors 140-A and 140-C of generated motion data frame 130-4 each show a small upward motion, contrary to the expert motion. As a result, comparing the motion vectors of all area segments 120-A, 120-B, 120-C and 120-D in generated motion data frame 130-3 with the motion vectors for the corresponding area segments 120-A, 120-B, 120-C and 120-D in reference motion data frame 130-1, and comparing the motion vectors of all area segments 120-A, 120-B, 120-C and 120-D in generated motion data frame 130-4 with the motion vectors for the corresponding area segments 120-A, 120-B, 120-C and 120-D in reference motion data frame 130-2, the motion of human 112' is only partially similar to the motion of expert 112.

An embodiment of the invention generates a similarity metric from the motion vectors which indicates the similarity between the motion of the subject (in this case human 112') and the reference motion (in this case the motion of the expert 112).

This similarity metric may be used to provide an output indicating, for example, whether the human 112' has correctly performed the exercise. In addition, or instead, this similarity metric may be used to provide an output indicating, for example, how the motion of the human 112' differed from the motion of the expert 112 and/or how the human 112' could change their motion in order to better imitate the expert 112. In addition or instead, the similarity metric may be used to trigger, or prevent, a predetermined event, such as access to a device or room, access to an application (app) or access to another level in a game, etc.

Figure 2:
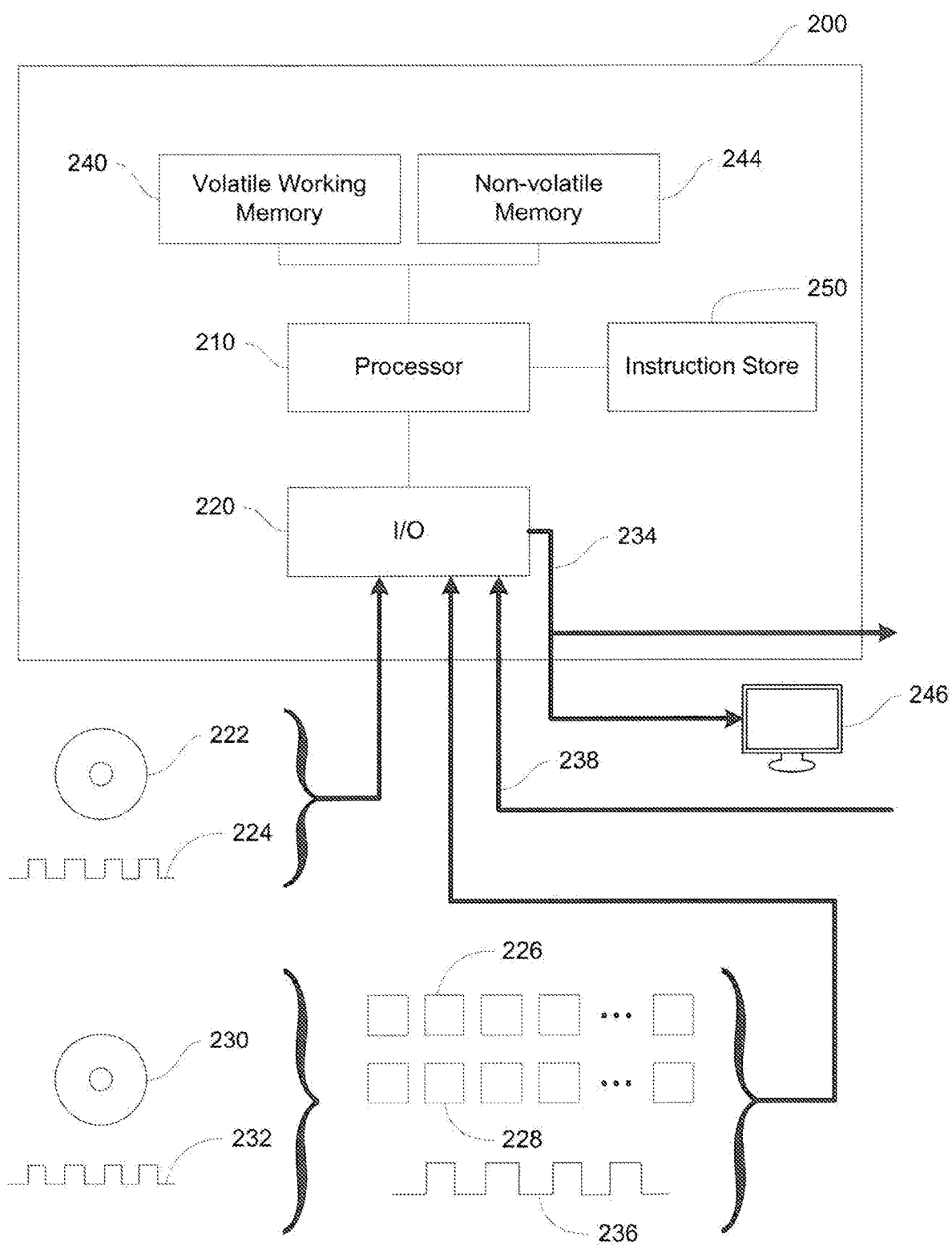
FIG. 2 is a schematic illustration of a programmable processing apparatus in which a video frame processing apparatus of an embodiment may be implemented.

FIG. 2 schematically illustrates an exemplary form of a programmable processing apparatus in which an embodiment of the invention may be implemented.

The programmable processing apparatus 200 shown in FIG. 2 comprises a processor 210, an input/output (I/O) interface 220, a volatile working memory 240, a non-volatile memory 244 and an instruction store 250.

The I/O interface 220 may function as an interface for any of: configuring the apparatus by receiving computer program instructions carried by a storage device 222 (such as a CD-ROM, flash memory, etc) and/or by a signal 224 (such as an electrical or optical signal), receiving reference motion data frames 226, receiving configuration data 236, receiving video frames 228 to be processed (the reference motion data frames, configuration data and video frames to be processed being input, for example, on a storage device 230 or as a signal 232), receiving user inputs and instructions 238, and providing output data 234 for display on a display device 246 or for export to another processing device (not shown).

The volatile working memory 240 and/or non-volatile memory 244 may be used for any of: storing reference motion data frames, storing configuration data, storing video frames to be processed, storing generated motion data frames, storing similarity metrics, and storing counters used for control flow in the processing of the video frames.

The instruction store 250 may comprise RAM or a similar type of memory that is configured to store computer program instructions input thereto from the storage medium 222 and/or the signal 224.

Figure 3:
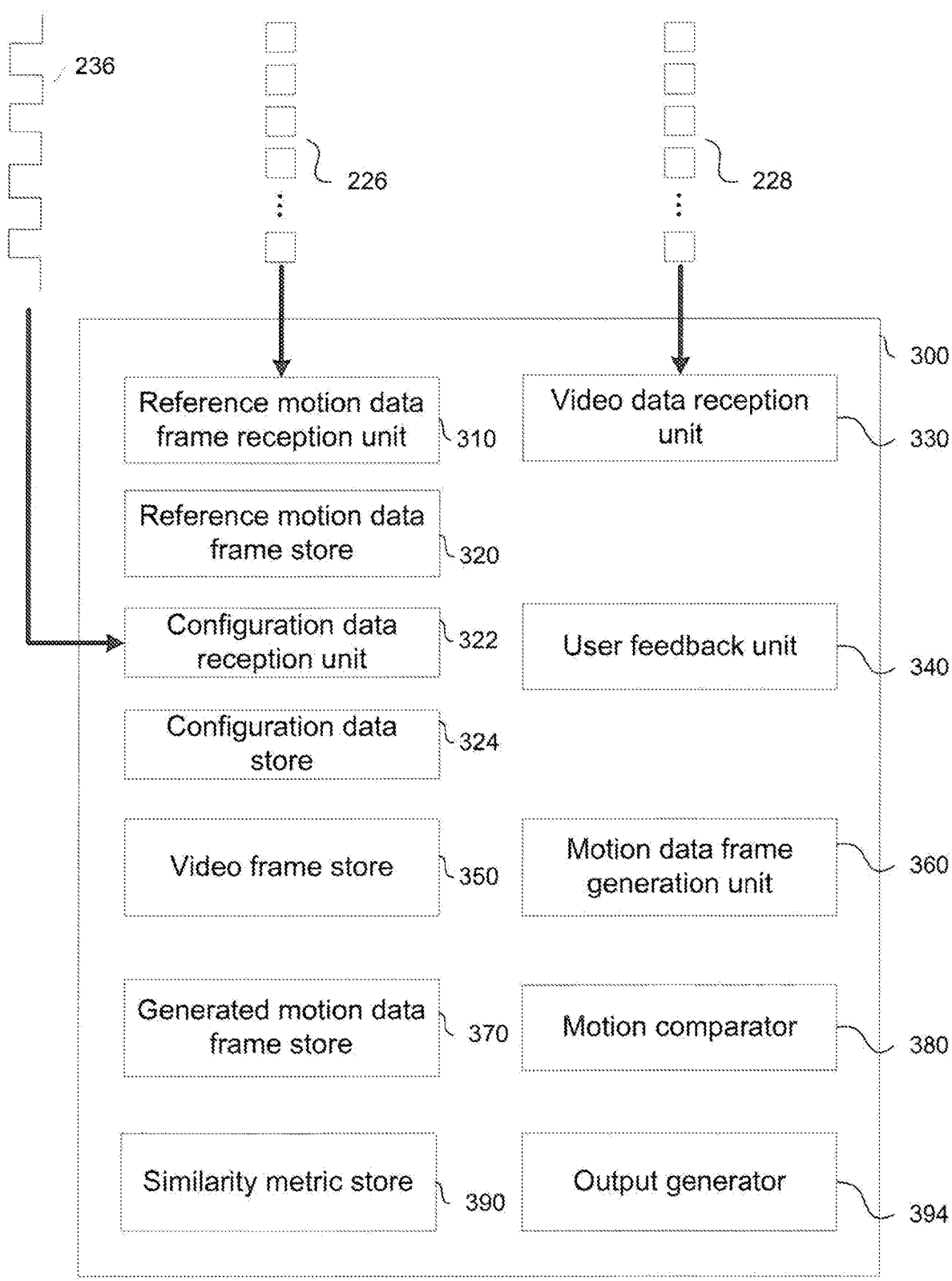
FIG. 3 is a schematic illustration of functional components of the video frame processing apparatus of an embodiment.

FIG. 3 shows functional components of a video frame processing apparatus 300 which may be implemented by programming the programmable processing apparatus 200 of FIG. 2 using computer program instructions.

The video frame processing apparatus 300 comprises a reference motion data frame reception unit 310, a reference motion data frame store 320, a configuration data reception unit 322, a configuration data store 324, a video data reception unit 330, a user feedback unit 340, a video frame store 350, a motion data frame generation unit 360, a generated motion data frame store 370, a motion comparator 380, a similarity metric store 390 and an output generator 394.

The reference motion data frame reception unit 310 is implemented by the processor 210 and the input/output interface 220, and is configured to receive a sequence 226 of reference motion data frames and to store the received reference motion data frames in reference motion data frame store 320. As explained previously, each reference motion data frame comprises optical flow vectors. In addition, in this embodiment, each reference motion data frame comprises a face vector defining a change of position of a face of the subject between the first reference video frame and the second reference video frame of the pair of reference video frames used to generate the reference motion data frame.

The reference motion data frame store 320 is implemented in the volatile working memory 240 and/or the non-volatile memory 244 and is configured to store a received sequence of reference motion data frames defining a reference motion.

The configuration data reception unit 322 is implemented by the processor 210 and the input/output interface 220, and is configured to receive configuration data 236 and to store the received configuration data in the configuration data store 324.

In this embodiment, the configuration data comprises reference frame rate data and area segment configuration data. The reference frame rate data defines a frame rate of the reference video frames that were used to generate the reference motion data frames. As will be explained later, this frame rate is used to select pairs of the video frames 228 to be processed. The area segment configuration data defines a required position and size for the face of a subject in a video frame to be processed. In this embodiment, the area segment configuration data specifies the required position and size by specifying a range of positions and range of sizes within which the size and position of the subject's face in a video frame to be processed should ideally be. The area segment configuration data also defines a positional configuration of the area segments (120-A, 120-B, 120-C and 120-D in the example of FIGS. 1A and 1B) in the reference video frames. The area segment configuration data also defines how the optical flow vectors of each of the reference motion data frames correspond to the area segments. As will be explained below, the area segment configuration data is used to determine corresponding area segments in the received video frames 228 that are to be processed.

In this embodiment, the area segment configuration data defines a relative position and relative size of each area segment. More particularly, the area segment configuration data defines a position for each area segment that is relative to a reference part of the subject and a size for each area segment that is relative to the reference part.

In the example of a human performing an exercise, the reference part of the subject is the person's face. The area segment configuration data then defines, for each area segment, a width and height that is a respective multiple of the face width (the multiples not being limited to integer multiples) and a position relative to the face.

More particularly, in this embodiment, the area segment configuration data defines a grid of area segments comprising rows and columns of adjacent area segments. In particular, the area segment configuration data defines a scalable area segment size in units of the face width. The scalable area segment size is multiplied by the face width to determine a scaled area segment size. The height and the width of each area segment in the grid of area segments are equal to the scaled area segment size. The area segment configuration data also defines a scalable two-dimensional relative position of a top-left area segment, in the grid, relative to the face, in units of the face width. The scalable two-dimensional relative position of the top-left area segment is multiplied by the face width to determine a scaled two-dimensional relative position of the top-left area segment. The position of the face is used together with the scaled two-dimensional relative position of the face to determine a position of the top-left area segment in the first video frame of the pair. The area segment configuration data further defines the number of area segments in a row of the grid and the number of area segments in a column of the grid. In the grid of area segments, a first row of adjacent area segments includes, and extends to the right of, the first area segment, and the columns of adjacent area segments include, and extend downward from, the first row of area segments. Accordingly, in this embodiment, individual area segments are identified using their two-dimensional coordinates within the grid of area segments. Although the area segment configuration data defines a relative position of the top-left area segment in this embodiment, the area segment configuration data may instead define a relative position of any other area segment of the grid in conjunction with the coordinates of this single area segment within the grid.

The technical advantages of specifying the position and size of each area segment relative to a reference part of the subject (the human face in the current example) will now be explained with reference to FIG. 4, in which only some of the area segments are shown for ease of understanding.

Figure 4:
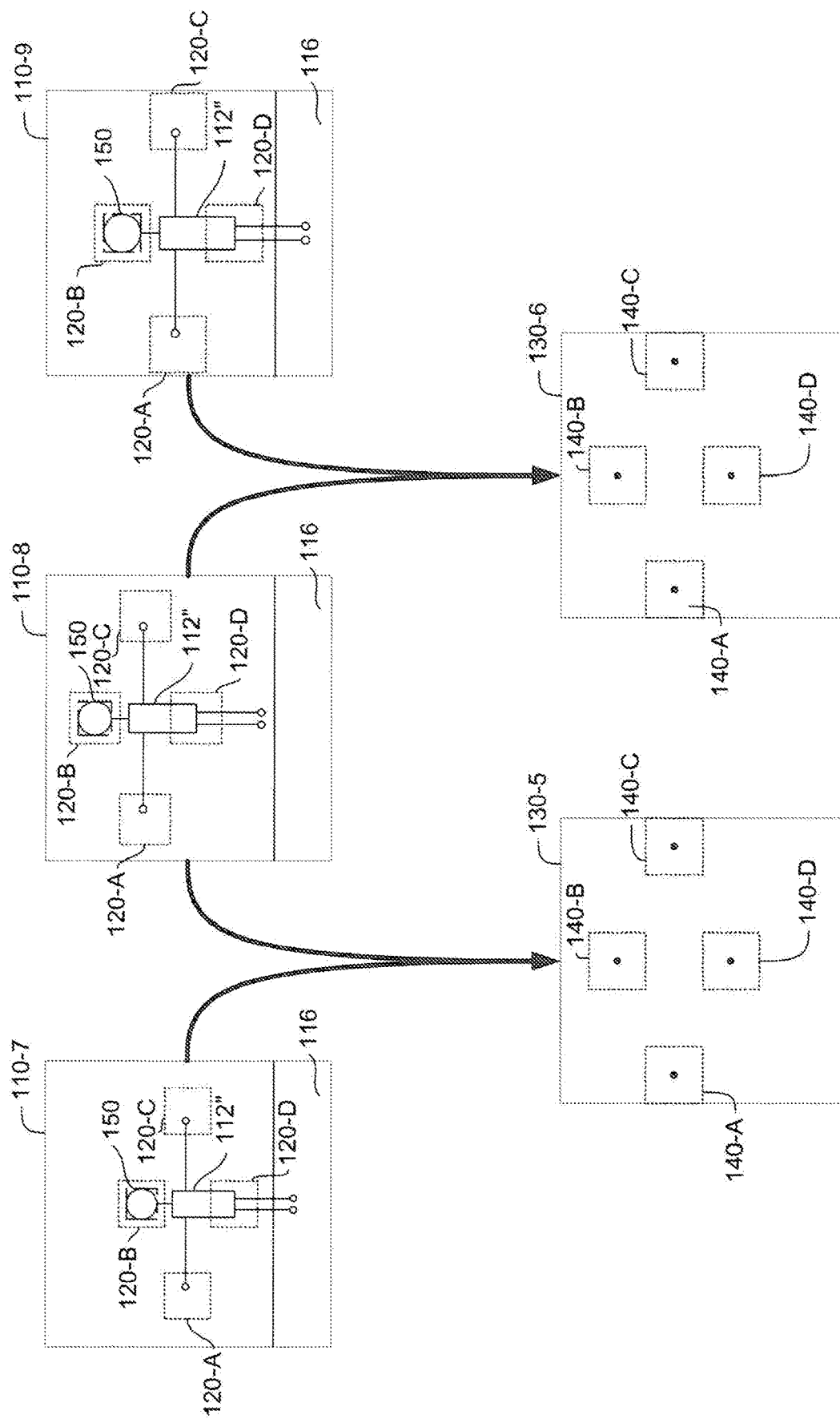
FIG. 4 is a schematic illustration of the advantages of scaling that is performed by the video frame processing apparatus.

The features of FIG. 4 are largely similar to FIG. 1A or 1B, but a position and size indicator 150 is illustrated which indicates the position and size of a face detected in each video frame 110. Accordingly, the description of the video frames 110, the subject 112", the floor 116, the area segments 120, the motion data frames 130 and the optical flow vectors 140, which are similar to the equivalently-numbered features of FIGS. 1A and 1B, will not be explained again here. In the example of FIG. 4, the subject 112" is a human user performing a motion which is to be compared to a reference motion. However, the subject 112" may alternatively be an expert performing a reference motion.

The video frames 110-7, 110-8 and 110-9 of FIG. 4 depict a "jump forward" motion of the subject 112". Accordingly, it can be seen that, between the illustrated video frames, the subject 112" moves up then down vertically and also his/her size increases from the perspective of the camera recording the video frames. It can also be seen that, in each successive video frame 110-7, 110-8, 110-9, the detected position and size indicator 150 moves up and down vertically relative to the video frame and changes size in accordance with the changing size of the subject 112". Additionally, because the area segments 120-A, 120-B, 120-C and 120-D are defined relative to the position and size of the face, the area segments also change position and size in accordance with the detected position and size indicator 150 in successive video frames.

All of the optical flow vectors 140-A, 140-B, 140-C and 140-D in both motion data frames 130-5 and 130-6 are zero vectors indicating no motion. No motion is detected because the area segments 120-A, 120-B, 120-C and 120-D move with the human subject 112" in each successive video frame, and the subject's shape is unchanged and remains rigid in this example. Accordingly, with this method of defining area segments, relative motion between the subject 112" and the camera recording the video frames is ignored when generating optical flow vectors, and only relative motion between portions of the subject 112" and the detected position and size indicator 150 is taken into account.

Referring again to FIG. 3, the configuration data store 324 is implemented in the volatile working memory 240 and/or the non-volatile memory 244 and is configured to store the received configuration data.

Although the configuration data store 324 is shown as a separate functional component, the reference frame rate data and/or area segment data may be part of the reference motion data frames. In the case that both are part of the reference motion data frames, the reference frame rate data and the segment data may be stored in the reference motion data frame store 320 and the configuration data store 324 may be omitted. Furthermore, even if the reference frame rate data and the area segment data are not part of the reference motion data frames, the reference frame rate data and the area segment data may be stored in the reference motion data frame store 320 and the area segment configuration data store 324 may be omitted.

The video data reception unit 330 is implemented by the processor 210 and the input/output interface 220, and is configured to receive a sequence 228 of video frames to be processed by the video frame processing apparatus, to pass the received video frames to the user feedback unit 340 and to store the received video frames in the video frame store 350.

The user feedback unit 340 is implemented by the processor 210 and the input/output interface 220, and is provided for use when a sequence of video frames 228 is received from a camera in real-time or with little delay, in order to ensure that the subject is correctly positioned for comparing the motion of the subject to the reference motion. The user feedback unit 340 is configured to detect a position and size of a face of a person that is the subject in the received video frames and to compare the detected position and size to a required position and size. The required position and size is a position and size of the face which indicates that the subject is correctly positioned for comparing the motion of the subject to the reference motion. The user feedback unit 340 is further configured to, in dependence upon the result of the comparison, provide feedback to the subject user to adjust his/her position. The feedback may, for example, be audio and/or visual feedback indicating how the user should move relative to the camera (that is, left, right, forwards or backwards). This feedback may be provided continuously in real-time until the person is in the correct position relative to the camera. When the user feedback unit 340 determines that the person is in a suitable position relative to the camera, the user feedback unit 340 informs the motion data frame generation unit 360 that processing can begin. In this embodiment, the required position and size is configured so that, when the person is in the correct position, all area segments of the grid, which is defined by the area segment configuration data relative to the face of the person, are located within the frame. More particularly, when the person is in the correct position, and the motion data frame generation unit 360 determines each area segment based on the area segment configuration data and relative to the position and size of the face of the person, none of the determined area segments are determined to be partially or completely outside the area of the video frame. Accordingly, user feedback unit 340 has the advantage of ensuring that, when pairs of the received video frames 228 are processed to compare motion of the person to a reference motion, an optical flow vector can be properly calculated for each area segment of the area segment configuration data, and the motion of the person can be properly compared to the reference motion.

The video frame store 350 is implemented in the volatile working memory 240 and/or the non-volatile memory 244 and is configured to store a received sequence of video frames.

The motion data frame generation unit 360 is implemented by the processor 210 and is configured to process pairs of the received video frames 228 stored in the video frame store 350 to generate a sequence of motion data frames defining motion of a subject in the received sequence of video frames. The generated motion data frames are stored in the generated motion data frame store 370.

The generated motion data frame store 370 is implemented in the volatile working memory 240 and/or the non-volatile memory 244 and is configured to store the generated motion data frames.

The motion comparator 380 is implemented by the processor 210, and is configured to compare the reference motion data frames stored in the reference motion data frame store 320 to a plurality of the generated motion data frames stored in the generated motion data frame store 370, and to generate a similarity metric for the motion of the subject and the reference motion. The motion comparator 380 is further configured to store the generated similarity metric in the similarity metric store 390.

The similarity metric store 390 is implemented in volatile working memory 240 and/or non-volatile memory 244 and is configured to store similarity metrics generated by motion comparator 380.

The output generator 394 is implemented by processor 210 and input/output interface 220, and is configured to generate an output based on a similarity metric stored in similarity metric store 390.

The processing operations performed by the video frame processing apparatus 300 in the present embodiment will now be described with reference to FIGS. 5 to 12.

Figure 5:
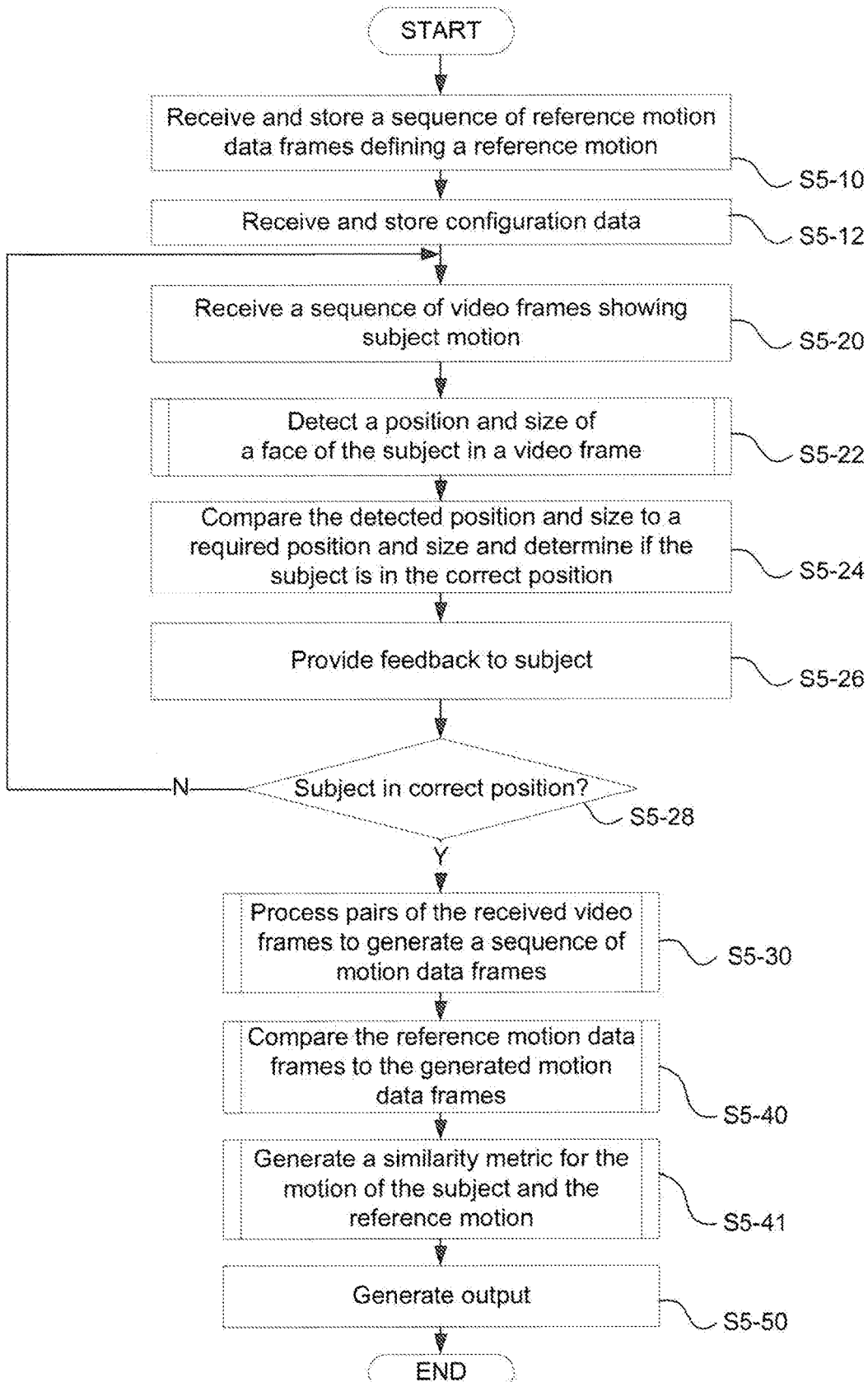
FIG. 5 is a flow diagram showing processing operations performed by the video frame processing apparatus.

Referring to FIG. 5, at step S5-10, the reference motion data frame reception unit 320 receives a sequence of reference motion data frames and stores the received reference motion data frames in the reference motion data frame store 320.

At step S5-12, the configuration data reception unit 322 receives configuration data comprising reference frame rate data and area segment configuration data and stores the received configuration data in the configuration data store 324. As explained above, the reference frame rate data defines the frame rate of the reference video frames that were used to generate the reference motion data frames. The area segment configuration data defines the positions of the area segments in the reference video frames, as well as how the optical flow vectors of each reference motion data frame correspond to the area segments.

At step S5-20, the video data reception unit 330 receives a sequence of video frames showing motion of a subject and stores the received video frames in the video frame store 350.

Figure 6:
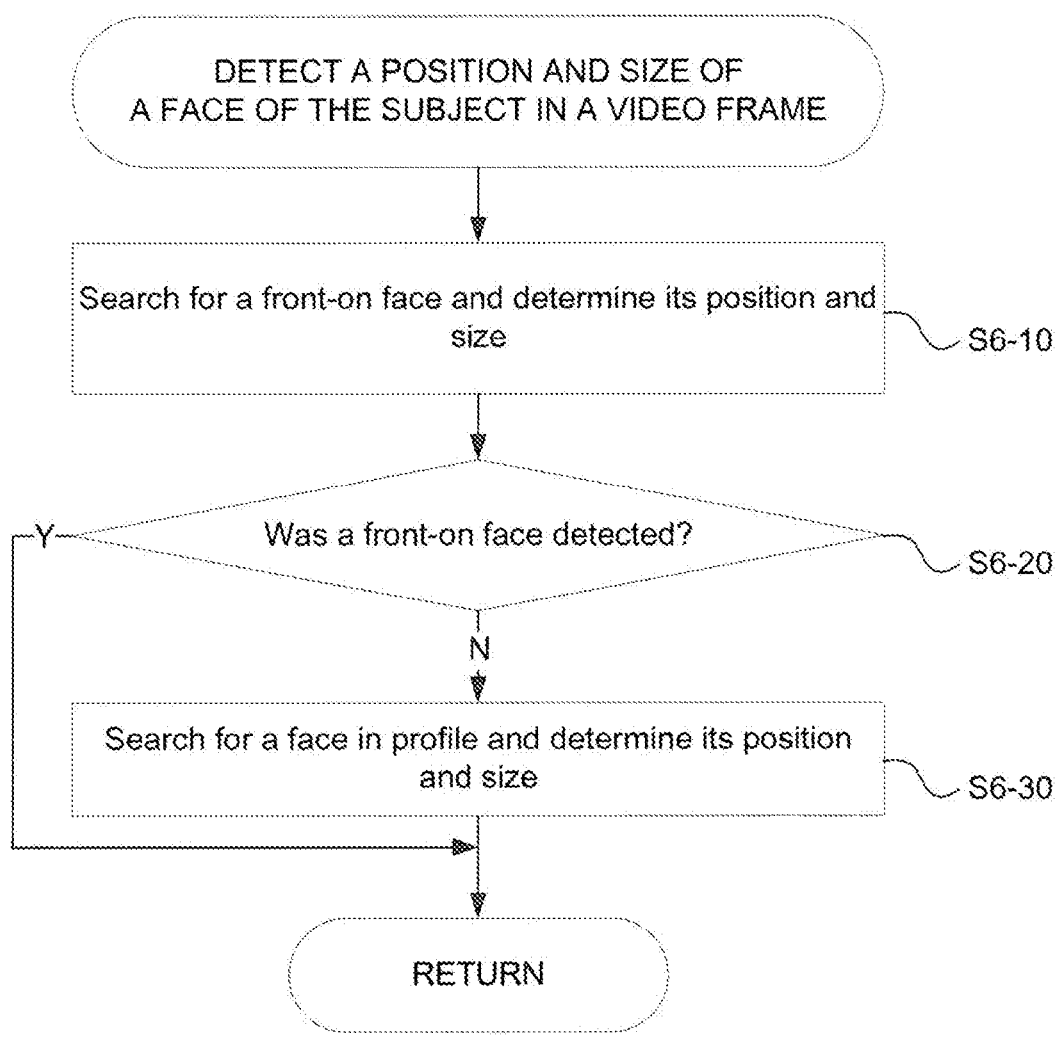
FIG. 6 is a flow diagram showing the processing operations performed by the video frame processing apparatus at step S5-22 of FIG. 5.
Figure 7:
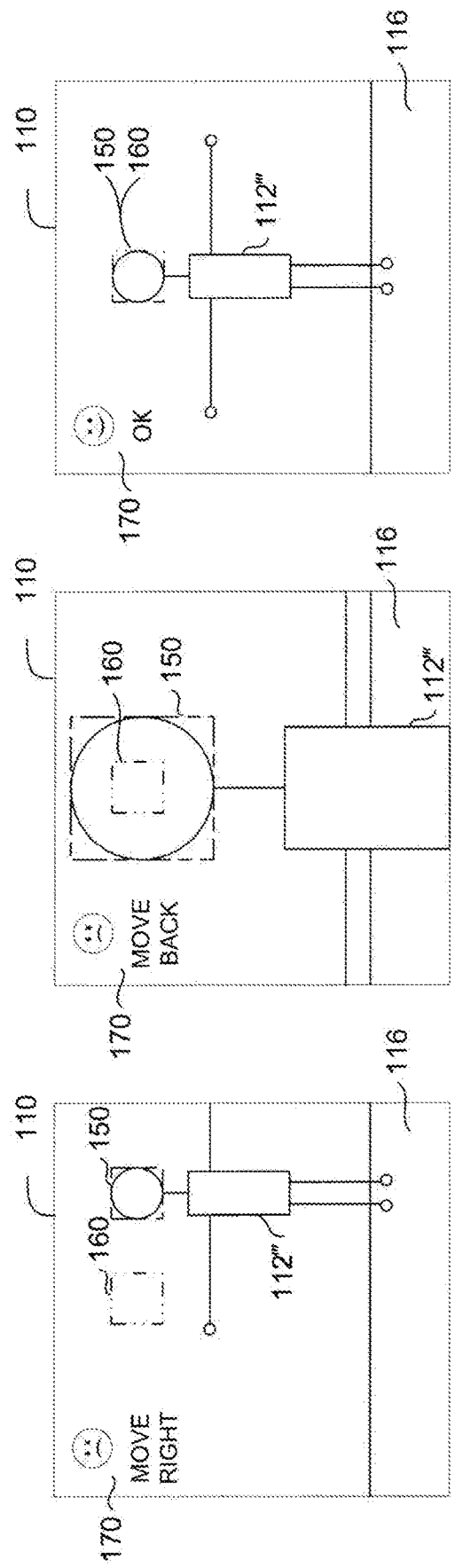
FIGS. 7A, 7B and 7C are schematic illustrations of user feedback provided at step S5-26 of FIG. 5.

At step S5-22, the user feedback unit 340 detects a position and size of a face of the subject in a video frame received by the video data reception unit 330 and stored in video frame store 350. The processing operations performed at step S5-22 by user feedback unit 340 are shown in FIG. 6, which will be described now before proceeding with description of FIG. 5.

At step S6-10, the user feedback unit 340 searches the video frame for a front-on face (that is, a face of a subject user who is looking directly towards a camera which recorded the video frame) and determines the position and size of the face if it finds one. In this embodiment, the width of the face of the subject is used as the size of the face. However, other indications of the size of the face, such as the height of the face, could be used instead. This step may be performed using any known face identification technique. However, in the present embodiment, a Haar cascade technique is used based on appropriate training data.

At step S6-20, the user feedback unit 340 assesses whether a front-on face was successfully detected in step S6-10. If a front-on face was successfully detected, then the flow of FIG. 6 is complete and processing continues with step S5-24 (described later). However, if no front-on face was detected, processing precedes to step S6-30.

At step S6-30, the user feedback unit 340 searches for a face which is in profile (that is, a face of a subject user who is positioned such that their face is partially visible, but they are not directly facing the camera) and determines the position and size of the face if it finds one. In this embodiment, the width of the face of the subject is used as the size of the face. However, other indications of the size of the face, such as the height of the face, could be used instead. This step can be performed using any known face identification technique, but in the present embodiment is performed using another Haar cascade with further appropriate training data for a face in profile. Step S6-30 could be omitted, in which case the user feedback unit 340 would either detect a front-on face or would fail to detect a face at all. Although it is not shown in FIG. 5 or FIG. 6, it is possible that the user feedback unit 340 may fail to detect a face at step S5-22, either facing the camera or in profile, in the video frame. In this case, the user feedback unit 340 continues to perform the processing operations at step S5-22 using new video frames received by video data reception unit 330 until a face is successfully detected, and then processing continues at step S5-24 of FIG. 5.

At step S5-24, the user feedback unit 340 compares the position and size detected in step S5-22 to the required position and size defined by the configuration data stored in the configuration data store 324, and determines if the subject is in the correct position. The correct position is a position at which the received video frames can be used for generating a similarity metric. If the detected position and size is within the range specified by the configuration data, user feedback unit 340 determines that the subject is in the correct position. Otherwise the user feedback unit 340 determines that the subject is not in the correct position.

At step S5-26, the user feedback unit 340 provides the subject with visual and/or audio feedback by means of, for example, the display device 246, in dependence upon whether the user feedback unit 340 determined in step S5-24 that the subject is in a correct position or an incorrect position. This feedback is provided to assist the subject in moving (if necessary) to a position which ensures that the subject is positioned correctly relative to the camera in order to obtain video frames which can be used for generating a similarity metric. FIGS. 7A, 7B and 7C show three examples of user feedback in different scenarios.

FIGS. 7A, 7B and 7C show examples of a display on the display device 246 comprising an image from a video frame 110 obtained by the camera, and showing a subject 112''' standing on a floor 116. The displayed image further comprises a position and size indicator 150, a required position and size indicator 160 and a user feedback indicator 170. Position and size indicator 150 is similar to the position and size indicator shown in the video frames of the example of FIG. 4; however, in the examples of FIGS. 7A, 7B and 7C, position and size indicator 150 is shown in the image on display device 246 and is detected at step S5-22 of FIG. 5. The position in the image of the required position and size indicator 160 indicates where the subject 112''' should stand in order to obtain video frames which can be used for generating a similarity metric, and the size of required position and size indicator 160 in the image indicates how far away from the camera the subject 112''' should stand in order to obtain video frames which can be used for generating a similarity metric.

In FIG. 7A, the subject 112''' is standing such that the position and size of their face, indicated by position and size indicator 150, is to the right of the required position and size indicator 160 within the image. Accordingly, the user feedback indicator 170 indicates that the subject is in a wrong position. In the present embodiment, this is indicated with an unhappy emoji although other feedback indicators 170 could be used instead. The user feedback indicator 170 also indicates that the subject 112''' should move to the right to achieve the required position and size in the video frame 110.

In FIG. 7B, the subject 112''' is standing such that the position and size of their face, indicated by position and size indicator 150, is larger than the required position and size indicator 160 within the image. Accordingly, the user feedback indicator 170 indicates that the subject is in the wrong position. In the present embodiment, this is indicated with an unhappy emoji although other feedback indicators 170 could be used instead. The user feedback indicator 170 also indicates that the subject 112''' should move back (i.e. away from the camera) to achieve the required position and size in the video frame 110.

In FIG. 7C, the subject 112''' is standing such that the position and size of their face, indicated by position and size indicator 150, is the same as the required position and size indicator 160 within the image. Accordingly, the user feedback indicator 170 indicates that the subject is in the correct position. In the present embodiment, this is indicated with a happy emoji although other feedback indicators 170 could be used instead. The user feedback indicator 170 also indicates that the subject 112''' does not need to move to achieve the required position and size in the video frame 110 by providing the message "OK".

At step S5-28, if the user feedback unit 340 determined at step S5-24 that the subject is not in the correct position, then processing returns to step S5-20, otherwise, processing continues at step S5-30.

At step S5-30, the motion data frame generation unit 360 processes pairs of the received video frames which are stored in the video frame store 350 to generate a sequence of motion data frames and to store the generated motion data frames in the generated motion data frame store 370.

Figure 8:
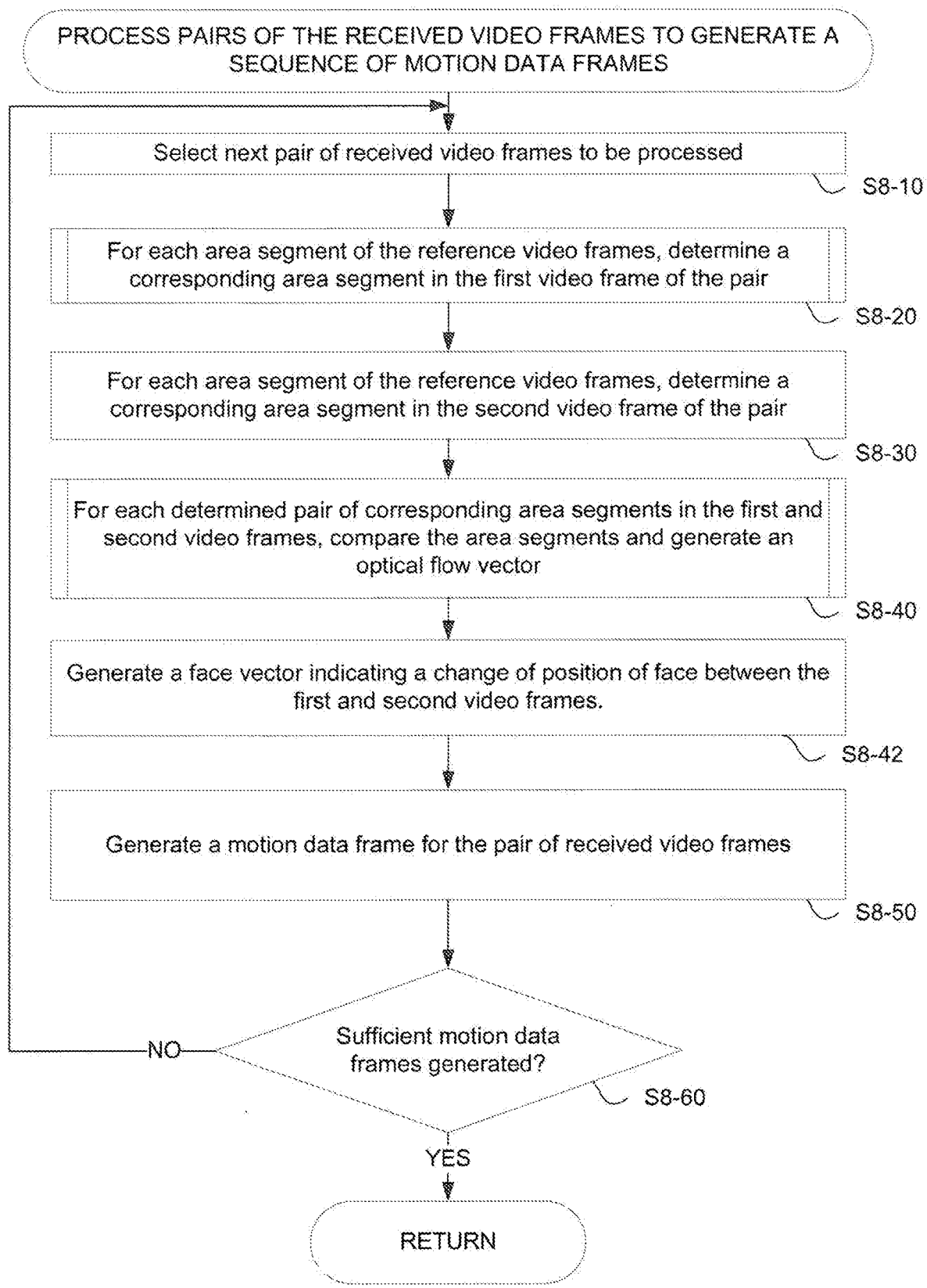
FIG. 8 is a flow diagram showing the processing operations performed by the video frame processing apparatus at step S5-30 of FIG. 5.

The processing operations performed at step S5-30 by the motion data frame generation unit 360 are shown in FIG. 8, which will be described now before proceeding with description of FIG. 5.

At step S8-10, the motion data frame generation unit 360 selects the next pair of the received video frames stored in the video frame store 350 to use as a pair of video frames for processing (this being the first pair the first time step S8-10 is performed). This selection is made by selecting a first video frame of the pair and selecting a second video frame of the pair that is later in the sequence of video frames than the first video frame, using the reference frame data stored at step S5-12.

In more detail, the first and second video frame should be selected in a way which enables synchronization between the generated motion data frames and the reference motion data frames, i.e. so that each generated motion data frame represents the same time period as a corresponding reference motion data frame.

For example, if a reference motion is captured at 10 video frames per second in the reference video frames, and the reference motion data frames have been generated from each adjacent pair of the reference video frames, then each reference motion data frame corresponds to 0.1 seconds of the reference motion. Accordingly, video frames of the subject motion received by the video data reception unit 330 at step S5-20 and stored in the video frame store 350 should be selected by the motion data frame generation unit 360 in accordance with their video frame rate and the time period (frame rate) of the reference motion data frames defined by the configuration data received at step S5-12. For example, if each reference motion data frame represents 0.1 seconds of motion, and the subject motion is captured at 20 video frames per second, then the motion data frame generation unit 360 should select alternating video frames of the sequence of video frames showing motion of the subject as the pairs of video frames to process. By way of example, the motion data frame generation unit 360 could, in this case, select the first and third video frames of the sequence of video frames stored in the video frame store 350 for generating a first motion data frame, and choose the third and fifth video frames of the sequence stored in the video frame store 350 to generate a second motion data frame, and so on.

Accordingly, at step S8-10, the motion data frame generation unit 360 reads the reference frame rate data previously stored as part of the configuration data at step S5-12 and uses this data to select a pair of video frames to be processed with the correct temporal separation in the received sequence of video frames.

If the received video frames in the video frame store 350 do not have a frame rate that is readily compatible with the frame rate of the reference motion data frames, then the motion data frame generation unit is configured to use interpolation to process the video frames stored in the video frame store 350 and artificially generate video frames of subject motion which can be used to generate a sequence of motion data frames with a temporal separation that is compatible with the reference motion data frames.

Figure 9:
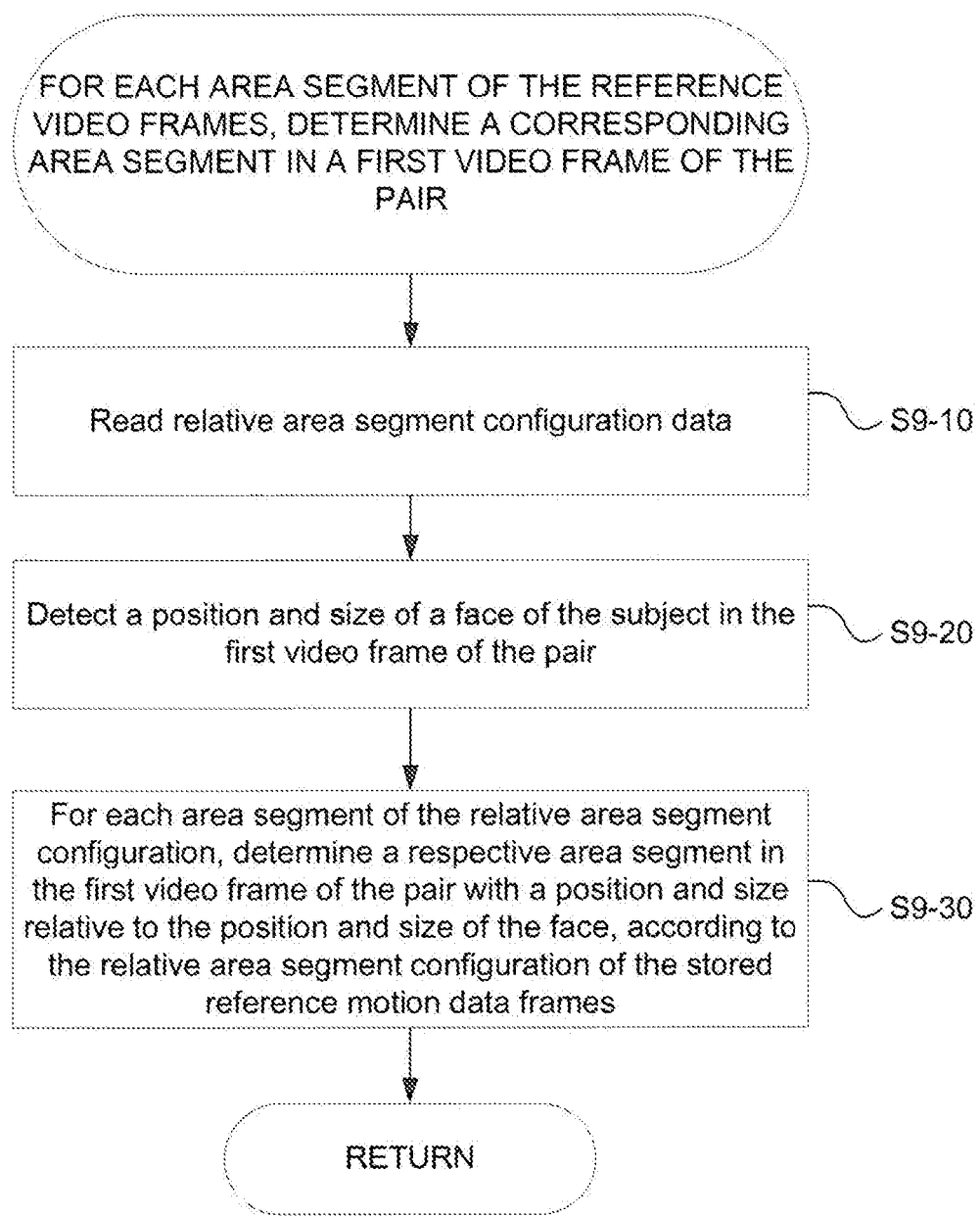
FIG. 9 is a flow diagram showing the processing operations performed by the video frame processing apparatus at step S8-20 of FIG. 8.

At step S8-20, for each area segment of the reference video frames, the motion data frame generation unit 360 determines a corresponding area segment in the first video frame of the pair of video frames currently being processed (that is, the pair selected at step S8-10). The processing operations performed at this step are shown in FIG. 9 which will be described now before continuing with FIG. 8.

At step S9-10, the motion data frame generation unit 360 reads the area segment configuration data that was previously stored at step S5-12. As explained previously, in the present embodiment, the area segment configuration data defines the area segment positions and sizes relative to a position and size of a face of the subject in each video frame.

At step S9-20, the motion data frame generation unit 360 detects a respective position and size of a face of the subject in the first video frame of the pair of video frames currently being processed. The processing operations performed at step S9-20 by the motion data frame generation unit 360 are the same as the processing steps performed by the user feedback unit 340 at step S5-22 of FIG. 5, and therefore these processing operations will not be explained again here.

At step S9-30, for each area segment defined in the area segment configuration data read at step S9-10, the motion data frame generation unit 360 determines a respective area segment in the first video frame of the pair with a position and size relative to the detected position and size of the face, according to the area segment configuration data.

More particularly, as explained previously, in this embodiment, the area segment configuration data defines a grid of area segments. The motion data frame generation unit 360 multiplies the scalable area segment size defined by the area segment configuration data by the face width which was determined in step S9-20 to determine a scaled area segment size. The motion data frame generation unit 360 sets the height and the width of each area segment in the grid of area segments to be the scaled area segment size. The motion data frame generation unit 360 multiplies the scalable two-dimensional relative position of the top-left area segment defined by the area segment configuration data by the face width to determine a scaled two-dimensional relative position of the top-left area segment. The motion data frame generation unit 360 uses the position of the face which was determined in step S9-20 together with the scaled two-dimensional relative position of the face to determine a position of the top-left area segment in the first video frame of the pair. The motion data frame generation unit 360 defines further area segments based upon the area segment configuration data which defines the number of rows and the number of columns of adjacent area segments in the grid.

After step S9-30, the processing operations shown in FIG. 9 for the first video frame of the pair are complete, and processing continues at step S8-30 of FIG. 8.

At step S8-30, the motion data frame generation unit 360 repeats the processing of step S8-20, but this time determines a corresponding area segment in the second video frame for each area segment of the reference video frames. As this processing has already been described above, it will not be described again here.

Figure 10A:
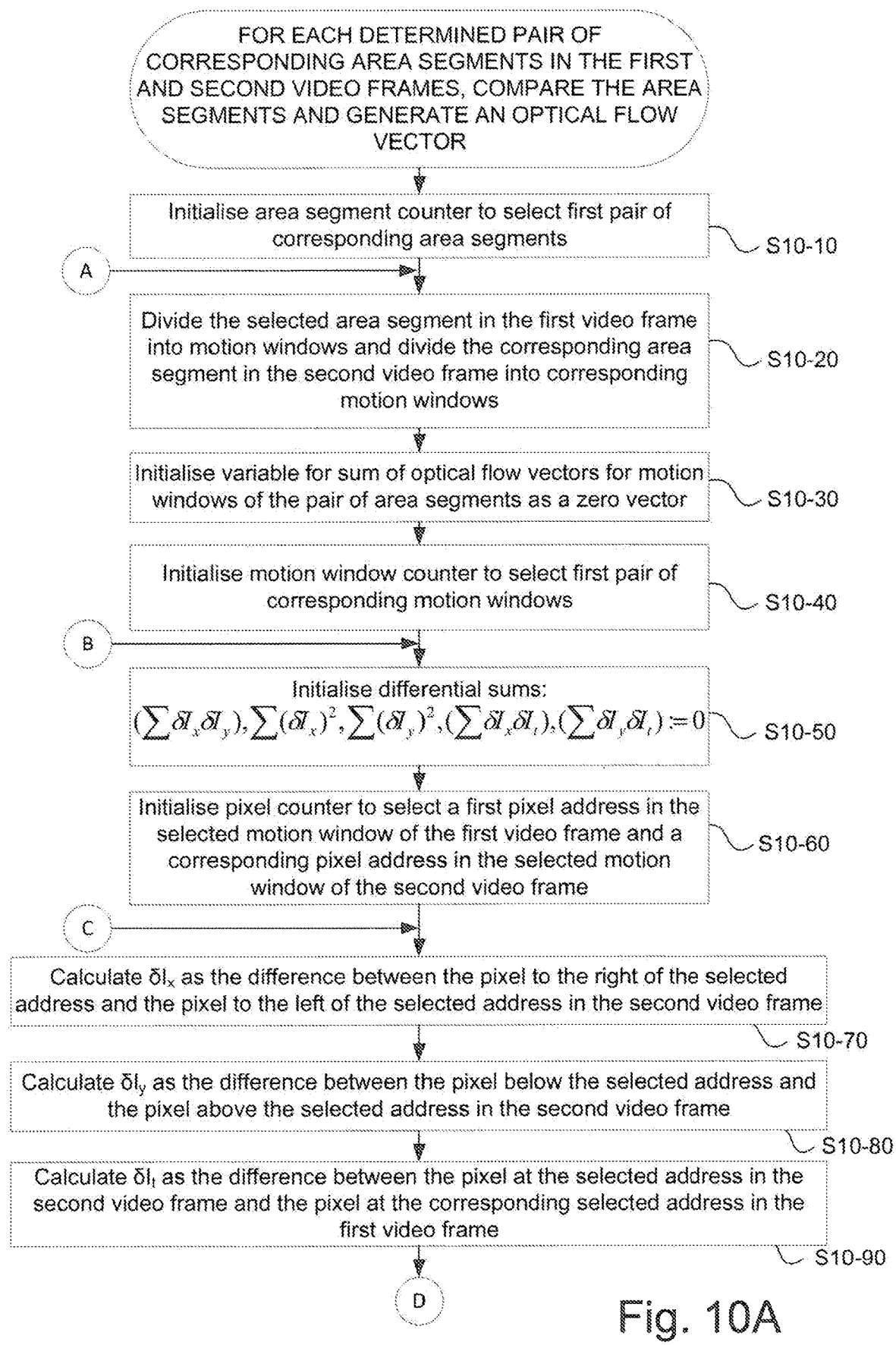
FIGS. 10A and 10B are flow diagrams showing the processing operations performed by the video frame processing apparatus at step S8-40 of FIG. 8.
Figure 10B:
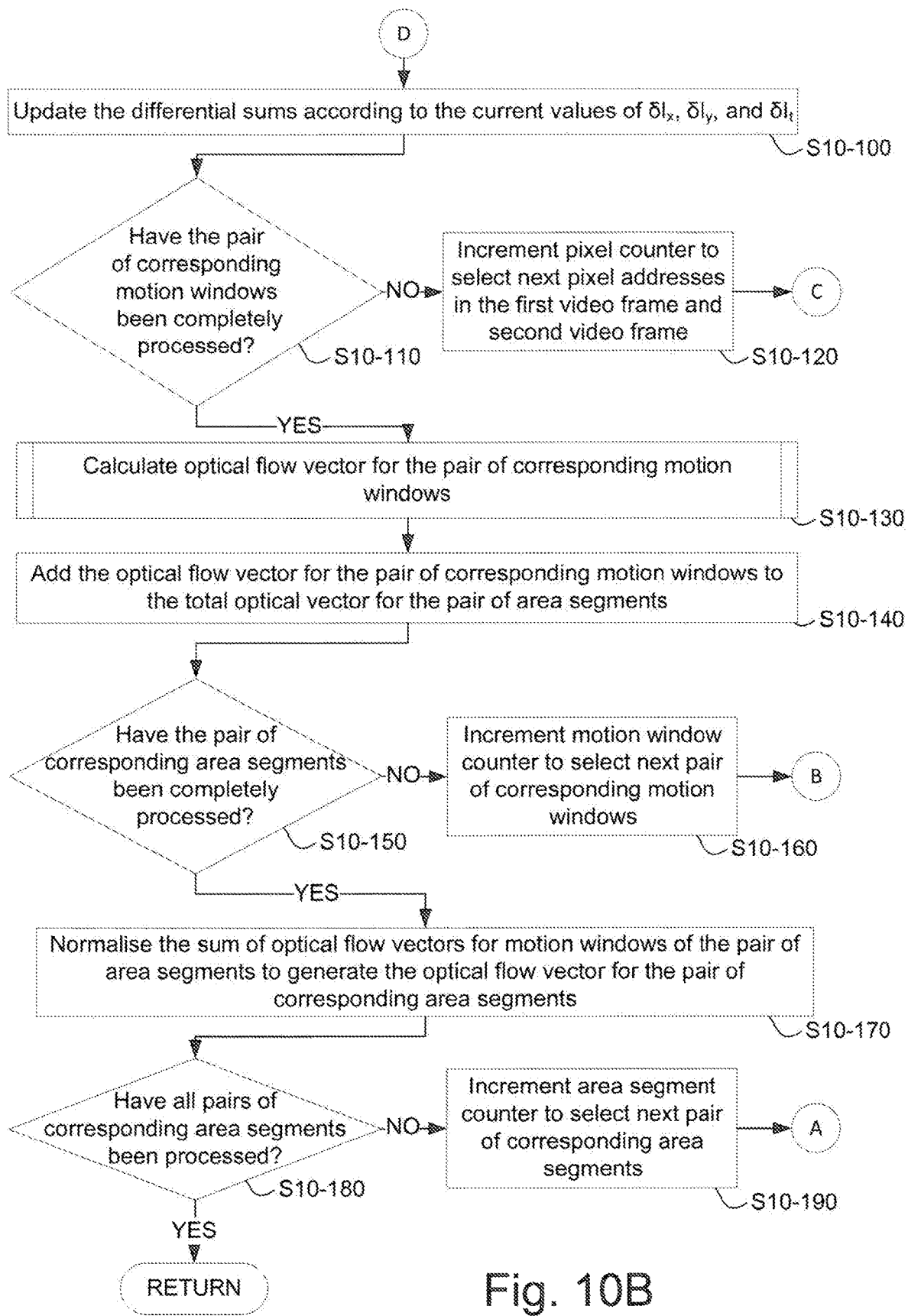

At step S8-40, the motion data frame generation unit 360 uses the area segments in the first video frame determined in step S8-20, and the area segments in the second video frame determined in step S8-30, to generate a respective optical flow vector for each pair of corresponding area segments. More particularly, for each determined pair of corresponding area segments in the first and second video frames, the motion data frame generator compares the area segments and generates an optical flow vector. The processing operations performed by the motion data frame generation unit 360 at step S8-40 are illustrated in FIGS. 10A and 10B which will be described next before completing description of FIG. 8.

At step S10-10, the motion data frame generation unit 360 initialises an area segment counter to select a first pair of corresponding area segments (that is, an area segment in the first video frame and the corresponding area segment in the second video frame). This area segment counter is used to iterate through the pairs of corresponding area segments in the first and second video frames, which were determined by the motion data frame generation unit 360 in steps S8-20 and S8-30. The area segment counter may be stored in volatile working memory 230 or non-volatile memory 234.

At step S10-20, the motion data frame generation unit 360 divides the area segment in the first video frame selected by the area segment counter into motion windows and divides the corresponding area segment in the second video frame into corresponding motion windows. The area segments are divided so as to increase the accuracy of the optical flow calculation by calculating a respective optical flow vector for each motion window and then combining the optical flow vectors for the motion windows into a single optical flow vector for the area segment. This combination of optical flow vectors may be performed in a number of different ways, but in the present embodiment is performed by calculating a sum of the respective optical flow vectors of the motion windows in the area segment.

In the present embodiment, the motion data frame generation unit 360 is configured with a motionWindowWidth parameter defining the size of motion window to use, and the motion data frame generation unit 360 divides the currently-selected area segment in the first video frame and the currently-selected area segment in the second video frame into a grid of motion windows, each motion window having a height and width of (2*motionWindowWidth+1) pixels. Each area segment contains as many motion windows as will fit in the area segment according to the parameter motionWindowWidth.

At step S10-30, the motion data frame generation unit 360 initialises a variable which is to contain a sum of optical flow vectors for the motion windows generated at step S10-20 of the pair of area segments. The initial value of this variable is a zero vector. This sum of optical flow vectors variable may be stored in the volatile working memory 240 or the non-volatile memory 244.

At step S10-40, the motion data frame generation unit 360 initialises a motion window counter to select a first pair of corresponding motion windows that were generated at step S10-20. This motion window counter may be stored in the volatile working memory 240 or the non-volatile memory 244, and is used to iterate through the corresponding motion windows of the currently selected pair of corresponding area segments.

At step S10-50, the motion data frame generation unit 360 initialises five variables in preparation for performing a Lucas-Kanade method to calculate optical flow. In particular, the motion data frame generation unit 360 uses a first variable $\Sigma \delta I_x \delta I_y$ to store a sum of products of intensity change in the horizontal (x) direction (x-gradients) and intensity change in the vertical (y) direction (y-gradients), a second variable $\Sigma \delta I_x^2$ to store a sum of squared x-gradients, a third variable $\Sigma \delta I_y^2$ to store a sum of squared y-gradients, a fourth variable $\Sigma \delta I_x \delta I_t$ to store a sum of products of x-gradients and intensity change in the time (t) direction (t-gradients), and a fifth variable $\Sigma \delta I_y \delta I_t$ to store a sum of y-gradients and t-gradients. Each of these five variables is initialised to have a value of 0. The x-gradient $\delta I_x$, y-gradient $\delta I_y$ and t-gradient $\delta I_t$ are respectively a horizontal, vertical and time gradient of local pixel values at locations within the corresponding motion windows, as will be explained below.

At step S10-60, the motion data frame generation unit 360 initialises a pixel counter to select a first pixel address in the selected motion window of the first video frame and a corresponding pixel address in the selected motion window of the second video frame. The pixel counter is used to iterate through the pixels of the currently-selected motion window in each of the first and second video frames, and may be stored in the volatile working memory 240 or the non-volatile memory 244.

In the present embodiment, the pixel counter comprises a horizontal counter and a vertical counter to count across the rows and columns of pixels contained in the motion window. As an example, the motion data frame generation unit may use the pixel counter to count across rows and columns of the motion window starting from the top left pixel of the motion window and ending at the bottom right pixel of the motion window, although it will be understood that the pixel counter be used in other ways.

The motion data frame generation unit 360 having selected an area segment of each of the first and second video frames, a motion window within each area segment, and a pixel location within each motion window, comparison of the video frames begins at step S10-70.

At step S10-70, the motion data frame generation unit 360 calculates an intensity change in the horizontal direction $\delta I_x$ in the second video frame by determining the difference between the intensity of the pixel to the right of the selected pixel address and the intensity of the pixel to the left of the selected pixel address. If the pixels are monochrome, the motion data frame generation unit 360 performs a subtraction of intensities. On the other hand, if the pixels are colour pixels with multiple colour channels, the motion data frame generation unit 360 selects the red colour channel and performs a subtraction of the pixel values in the red colour channel.

At step S10-80, the motion data frame generation unit 360 calculates an intensity change in the vertical direction $\delta I_y$ in the second video frame by determining the difference between the intensity of the pixel below the selected address and the intensity of the pixel above the selected address. If the pixels are monochrome, the motion data frame generation unit 360 performs a subtraction of intensities. On the other hand, if the pixels are colour pixels with multiple colour channels, the motion data frame generation unit 360 selects the red colour channel and performs a subtraction of the pixel values in the red colour channel.

At step S10-90, the motion data frame generation unit 360 calculates an intensity change in the time direction $\delta I_t$ by determining the difference between the intensity of the pixel at the selected address in the second video frame and the intensity of the pixel at the corresponding selected address in the first video frame. If the pixels are monochrome, the motion data frame generation unit 360 performs a subtraction of intensities. On the other hand, if the pixels are colour pixels with multiple colour channels, the motion data frame generation unit 360 selects the red colour channel and performs a subtraction of the pixel values in the red colour channel.

Having calculated $\delta I_x$, $\delta I_y$ and $\delta I_t$, at step S10-100, the motion data frame generation unit 360 updates the variables initialised in step S10-50. More particularly, the motion data frame generation unit 360 adds the product of $\delta I_x$ and $\delta I_y$ to the first variable $\Sigma \delta I_x \delta I_y$, adds the square of $\delta I_x$ to the second variable $\Sigma \delta I_x^2$, adds the square of $\delta I_y$ to the third variable $\Sigma \delta I_y^2$, adds the product of $\delta I_x$ and $\delta I_t$ to the fourth variable $\Sigma \delta I_x \delta I_t$, and adds the product of $\delta I_y$ and $\delta I_t$ to the fifth variable $\Sigma \delta I_y \delta I_t$.

At step S10-110, the motion data frame generation unit 360 determines whether the pair of corresponding motion windows has been completely processed. For example, in the case where a motion window is processed from the top left pixel to the bottom right pixel, the motion data frame generation unit 360 determines whether the current selected pixel address is the address of the bottom right pixel of the motion window.

In the case where the pair of motion windows has not been completely processed, processing continues at step S10-120. In this step, the motion data frame generation unit 360 increments the pixel counter to select a next pixel address in the currently-selected motion window in each of the first video frame and the second video frame. Processing then returns to step S10-70.

On the other hand, if in step S10-110 it is determined that the pair of corresponding motion windows has been completely processed, then processing continues at step S10-130. In this step, the motion data frame generation unit 360 calculates an optical flow vector for the currently-selected pair of corresponding motion windows. The processing operations performed by the motion data frame generating unit 360 at step S10-130 are shown in FIG. 11 which will be described now before completing description of FIG. 10.

Figure 11:
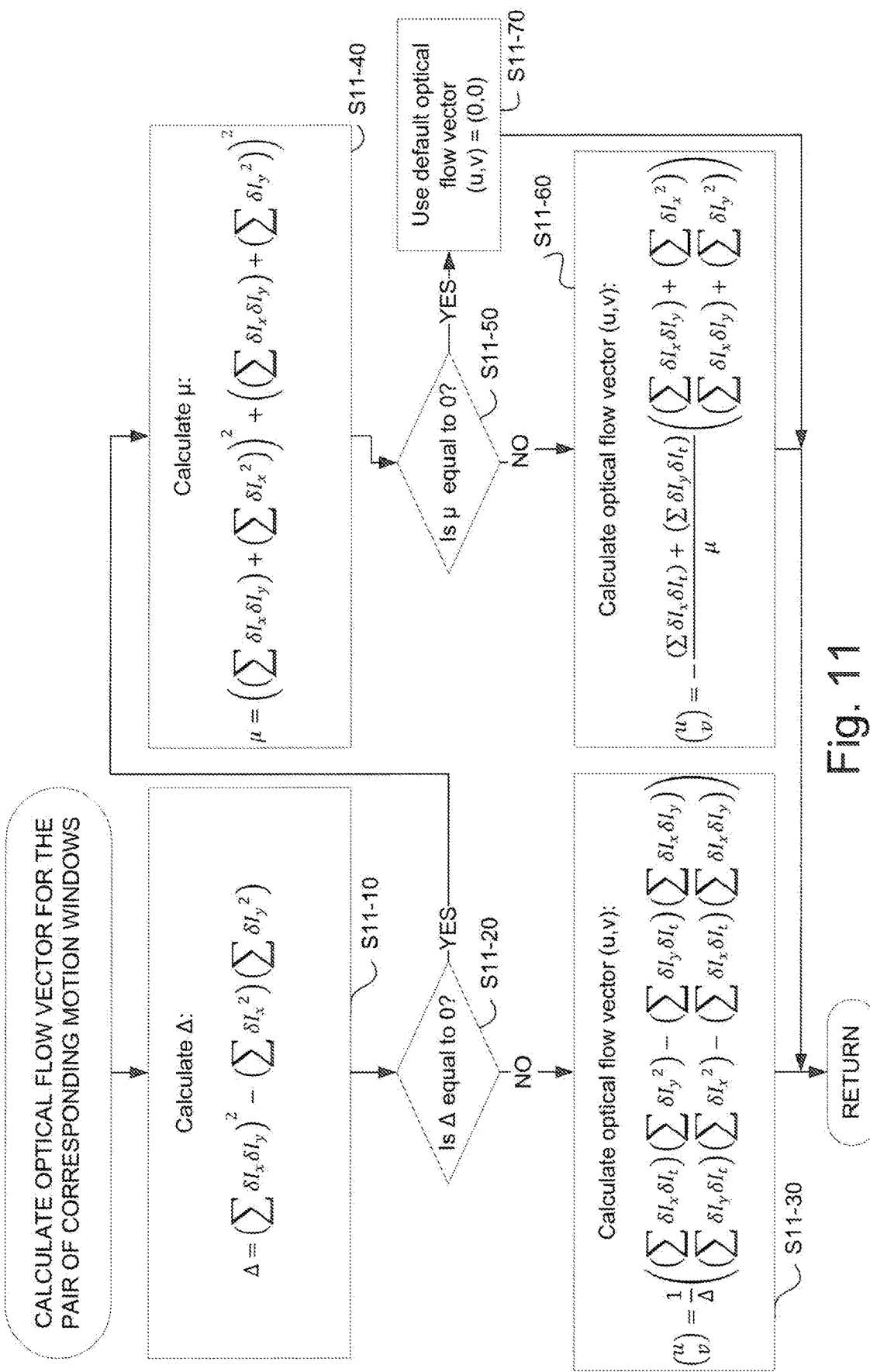
FIG. 11 is a flow diagram showing the processing operations performed by the video frame processing apparatus at step S10-130 of FIG. 10B.

As an overview of FIG. 11, an optical flow vector (u,v) is calculated based on the differential sum variables $\Sigma \delta I_x \delta I_y$, $\Sigma \delta I_x^2$, $\Sigma \delta I_y^2$, $\Sigma \delta I_x \delta I_t$ and $\Sigma \delta I_y \delta I_t$ which were calculated at steps S10-60 to S10-120. This optical flow vector calculation is based on the Lucas-Kanade method and Cramer's rule.

In step S11-10, the motion data frame generation unit 360 calculates a value $\Delta$ in accordance with equation (1):

$$\Delta = (\Sigma \delta I_x \delta I_y)^2 - (\Sigma \delta I_x^2)(\Sigma \delta I_y^2) \qquad (1)$$

At step S11-20, the motion data frame generation unit 360 determines whether the calculated $\Delta$ value is equal to zero.

If $\Delta$ is not equal to zero, then processing continues at step S11-30 in which the motion data frame generation unit 360 calculates the optical flow vector (u,v) for the pair of corresponding motion windows in accordance with equation (2):

$$\begin{pmatrix} u \\ v \end{pmatrix} = \frac{1}{\Delta} \begin{pmatrix} (\sum \delta I_x \delta I_t)(\sum \delta I_y^2) - (\sum \delta I_y \delta I_t)(\sum \delta I_x \delta I_y) \\ (\sum \delta I_y \delta I_t)(\sum \delta I_x^2) - (\sum \delta I_x \delta I_t)(\sum \delta I_x \delta I_y) \end{pmatrix} \qquad (2)$$

On the other hand, if it was determined at step S11-20 that $\Delta$ is equal to zero, then processing continues at step S11-40, at which the motion data frame generation unit 360 calculates a value $\mu$ in accordance with equation (3):

$$\mu = ((\Sigma \delta I_x \delta I_y) + (\Sigma \delta I_x^2))^2 + ((\Sigma \delta I_x \delta I_y) + (\Sigma \delta I_y^2))^2 \qquad (3)$$

At step S11-50, the motion data frame generation unit 360 determines whether the value $\mu$ is equal to zero. If it is determined that $\mu$ is not equal to zero, then processing continues at step S11-60, in which the motion data frame generation unit 360 calculates the optical flow vector (u,v) for the pair of corresponding motion windows in accordance with equation (4):

$$\begin{pmatrix} u \\ v \end{pmatrix} = -\frac{(\sum \delta I_x \delta I_t) + (\sum \delta I_y \delta I_t)}{\mu} \begin{pmatrix} (\sum \delta I_x \delta I_y) + (\sum \delta I_x^2) \\ (\sum \delta I_x \delta I_y) + (\sum \delta I_y^2) \end{pmatrix} \qquad (4)$$

On the other hand, if it is determined that $\mu$ is equal to zero in step S11-50, then processing continues at step S11-70, in which the motion data frame generation unit 360 determines the optical flow vector for the pair of corresponding motion windows to be a default optical flow vector (u,v)=(0,0). This default value is provided in case both the calculations of step S11-30 and step S11-60 are unsolvable (due to requiring a division by zero in the case that $\Delta$ or $\mu$ is zero), and represents the possibility that an optical flow vector could not be determined for the pair of corresponding motion windows.

After the optical flow vector (u,v) for the pair of corresponding motion windows is determined in one of steps S11-30, S11-60 or S11-70, the processing operations of FIG. 11 are complete and processing continues at step S10-140 shown in FIG. 10B.

At step S10-140, the motion data frame generation unit 360 adds the optical flow vector calculated in step S10-130 for the currently-selected pair of corresponding motion windows to the variable for the sum of optical flow vectors for the area segment as a whole which was initialised in step S10-30.

At step S10-150, the motion data frame generation unit 360 determines whether the currently-selected pair of corresponding area segments has been completely processed, by determining whether all pairs of corresponding motion windows generated in step S10-20 have been processed. This determination is performed by comparing the value of the motion window counter initialised in step S10-40 to the number of pairs of corresponding motion windows generated in step S10-20.

If it is determined at step S10-150 that not all pairs of corresponding motion windows have been processed, processing continues at step S10-160 in which the motion data frame generation unit 360 increments the motion window counter initialised in step S10-40 in order to select a next pair of corresponding motion windows. Processing then returns to step S10-50, and the next pair of corresponding motion windows is processed.

On the other hand, if it is determined at step S10-150 that the currently-selected pair of corresponding area segments has been completely processed, then processing continues at step S10-170. In step S10-170, the motion data frame generation unit 360 normalises the sum of optical flow vectors which was initialised in step S10-30 and repeatedly added-to in successive performances of step S10-140. The normalisation can be performed in a number of different ways. However, in this embodiment, the motion data frame generation unit 360 divides the sum of optical flow vectors by the number of motion windows into which the area segment of each of the first and second video frames was divided in step S10-20. In this way, the sum of optical flow vectors is divided by the number of contributions to this sum which were added in repeated performances of step S10-140.

Additionally at step S10-170, in order to ensure that the optical flow vector for the pair of corresponding area segments is independent of the position and size of the face of the subject in received video frames, the motion data frame generation unit 360 further divides the normalised sum of optical flow vectors by the size of the face which was previously detected in the processing operations of step S8-30 for the second video frame. The resulting optical flow vector is used as the optical flow vector for the currently-selected pair of corresponding area segments.

At step S10-180, the motion data frame generation unit 360 determines whether all pairs of corresponding area segments in the first video frame and second video frame have been processed. This is performed by comparing the value of the area segment counter initialised in step S10-10 to the number of pairs of corresponding area segments in the first and second video frames.

If it is determined at step S10-180 that not all of the pairs of corresponding area segments have been processed, processing continues at step S10-190, in which the motion data frame generation unit 360 increments the area segment counter which was initialised in step S10-10, and thereby selects a next pair of corresponding area segments in the first video frame and second video frame. Processing then returns to step S10-20, and an optical flow vector is calculated for the next pair of corresponding area segments.

On the other hand, if it is determined at step S10-180 that all pairs of corresponding area segments have been processed for the first and second video frames, then the processing operations in FIGS. 10A and 10B are complete and processing continues at step S8-42 shown in FIG. 8.

At step S8-42, the motion data frame generation unit 360 generates a face vector indicating a change of position of the face of the subject in the currently-selected pair of corresponding video frames. This is performed using the position and size of the face in the first video frame of the pair detected at step S9-20 during the processing of step S8-20, and the corresponding position and size of the face in the second video frame of the pair detected during the processing of step S8-30. More particularly, in the present embodiment, the motion data frame generation unit 360 generates the face vector by calculating the vector difference between the position of the face in the first video frame and the position of the face in the second video frame and normalising the calculated difference by dividing the calculated difference by the size (i.e. width in this embodiment) of the face in the second video frame.

At step S8-50, the motion data frame generation unit 360 generates a motion data frame for the pair of video frames currently being processed (that is, the pair of video frames selected at step S8-10) and stores the motion data frame in the generated motion data frame store 370.

The motion data frame comprises the optical flow vectors generated in step S8-40 for each pair of corresponding area segments, and also comprises the face vector generated in step S8-42 indicating a change of position of the face of the subject.

At step S8-60, the motion data frame generation unit 360 determines whether a sufficient number of motion data frames have been generated. More particularly, in this embodiment, the motion data frame generation unit 360 determines if the number of motion data frames stored in the generated motion data frame store 370 is as large as the number of reference motion data frames. If the number of generated motion data frames is less than the number of reference motion data frames, then processing returns to step S8-10 and a further motion data frame is generated. On the other hand, if the number of motion data frames that have been generated is at least equal to the number of reference motion data frames, then processing continues at step S5-40 shown in FIG. 5.

Figure 12:
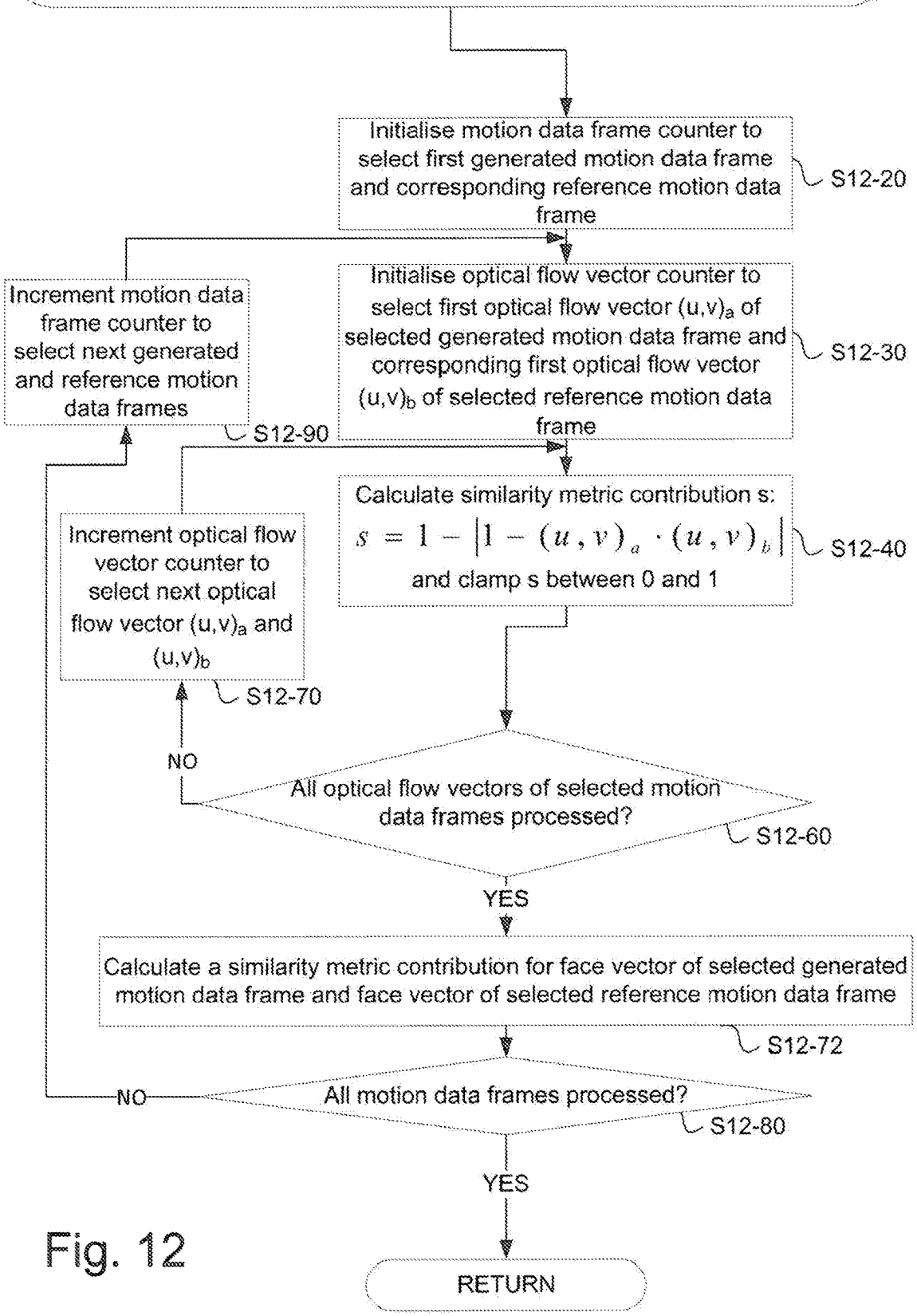
FIG. 12 is a flow diagram showing the processing operations performed by the video frame processing apparatus at step S5-40 of FIG. 5.

At step S5-40, the motion comparator 380 compares the reference motion data frames stored in reference motion data frame store 320 to the generated motion data frames stored in generated motion data frame store 370. The processing operations performed by the motion comparator 380 at step S5-40 in the present embodiment are shown in FIG. 12 which will be described next.

At step S12-20, the motion comparator 380 initialises a motion data frame counter to select a first generated motion data frame and a first reference motion data frame. The first generated motion data frame and first reference motion data frame are, in this embodiment, respectively selected as the first motion data frame in each of the generated motion data frame sequence and the reference motion data frame sequence stored respectively in the generated motion data frame store 370 and the reference motion data frame store 320. The motion data frame counter may be stored in the volatile working memory 240 or the non-volatile memory 244.

At step S12-30, motion comparator 380 initialises an optical flow vector counter to select a first optical flow vector $(u,v)_a$ of the optical flow vectors which form the selected generated motion data frame and a corresponding first optical flow vector $(u,v)_b$ of the optical flow vectors which form the selected reference motion data frame (corresponding optical flow vectors being the optical flow vectors generated for the same area segment in the first and second video frames).

At step S12-40, the motion comparator 380 calculates a similarity metric contribution S based on the selected optical flow vectors $(u,v)_a$ and $(u,v)_b$, and stores the calculated similarity metric contribution in the volatile working memory 240 or the non-volatile memory 244.

The similarity metric contribution S could be calculated in a number of different ways. However, in this embodiment, the motion comparator 380 calculates the similarity metric contribution S using equation (5):

$$s = 1 - |1 - (u,v)_a \cdot (u,v)_b| \quad (5)$$

The motion comparator 380 then clamps this value of the similarity metric contribution S to take only values between 0 and 1, where any value lower than 0 is replaced with 0 and any value higher than 1 is replaced with 1.

This method of calculating a similarity metric contribution by the motion comparator 380 at step S12-40 in the present embodiment is effective due to its focus on optical flow vectors which are similar, while placing less emphasis on optical flow vectors which differ between the compared motions.

At step S12-60, the motion comparator 380 determines whether all optical flow vectors of the currently-selected motion data frames have been processed, that is whether a similarity metric contribution S has been calculated for each pair of corresponding optical flow vectors of the currently-selected generated motion data frame and reference motion data frame.

If it is determined in step S12-60 that not all of the optical flow vectors of the currently selected motion data frames have been processed, then processing continues at step S12-70 in which the motion comparator 380 increments the optical flow vector counter which was initialised in step S12-30 in order to select a next optical flow vector $(u,v)_a$ of the generated motion data frame that is currently selected and a corresponding optical flow vector $(u,v)_b$ of the reference motion data frame that is currently selected, and the process returns to step S12-40.

On the other hand, if it is determined at step S12-60 that all optical flow vectors of the currently-selected motion data frames have been processed, then processing continues at step S12-72.

At step S12-72, the motion comparator 380 calculates a further similarity metric contribution S using a calculation similar to equation (5), but where the optical flow vectors $(u,v)_a$ and $(u,v)_b$ are replaced with the face vector indicating a change of position of the face of the subject of the currently-selected generated motion data frame and the corresponding face vector of the currently-selected reference motion data frame. The motion comparator 380 then stores this further similarity metric contribution S in the volatile working memory 240 or the non-volatile memory 244.

At step S12-80, the motion comparator 380 determines whether all motion data frames have been processed, that is, whether each reference motion data frame stored in reference motion data frame store 320 has been compared to a respective generated motion data frame stored in generated motion data frame store 370.

If it is determined at step S12-80 that not all reference motion data frames have been compared to a generated motion data frame, then processing continues at step S12-90 in which the motion comparator 380 increments the motion data frame counter which was initialised in step S12-20 in order to select the next generated motion data frame in the sequence stored in the generated motion data frame store 370 and the next reference motion data frame in the sequence stored in the reference motion data frame store 320. Processing then returns to step S12-30.

On the other hand, if it is determined at step S12-80 that all motion data frames have been processed, then the processing operations of FIG. 12 are complete, and processing continues at step S5-41 of FIG. 5.

Figure 13:
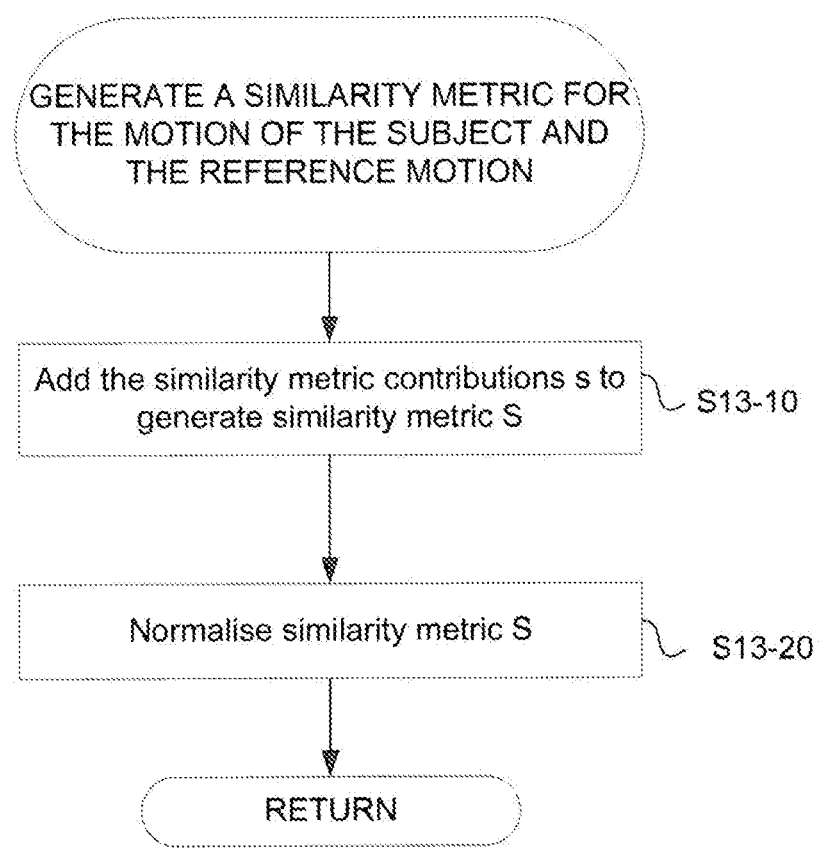
FIG. 13 is a flow diagram showing the processing operations performed by the video frame processing apparatus at step S5-41 of FIG. 5.

Referring again to FIG. 5, at step S5-41, the motion comparator 380 uses the similarity metric contributions generated at step S5-40 to generate a similarity metric for the motion of the subject represented by the generated motion data frames and the reference motion represented by the reference motion data frames. This generated similarity metric is stored in the similarity metric store 390. The processing operations performed by the motion comparator 380 at step S5-41 in the present embodiment are shown in FIG. 13 which will be described next.

At step S13-10, the motion comparator 380 adds together the similarity metric contributions calculated at steps S12-40 and S12-72 to generate a similarity metric S.

Optionally, at step S13-20, the motion comparator 380 normalises the similarity metric S. This normalisation can be performed in a number of different ways. However, in the present embodiment the motion comparator 380 divides the similarity metric S by the number of similarity metric contributions S which have contributed to the similarity metric S. This normalised similarity metric S is stored in the similarity metric store 390.

Referring again to FIG. 5, at step S5-50, output generator 394 generates an output. In the present embodiment, the motion comparator 380 compares the similarity metric stored in the similarity metric store 390 with a predetermined threshold to determine whether the subject person successfully completed the exercise (indicated by the value of the similarity metric being equal to, or above, the threshold) or did not successfully complete the exercise (indicated by the value of the similarity metric being below the threshold). The motion comparator 380 then causes an image to be displayed on display device 246 informing the user whether or not he/she successfully completed the exercise.

[Modifications and Variations]

Many modifications and variations can be made to the embodiments described above without departing from the scope of the present invention.

For example, in the described embodiments, the subject is a human. However, instead, the subject may be a group of humans and the motion may be their combined motion. In this case, the expert would also be a group of humans performing a combined reference motion. More generally, the subject may be any of one or more moving creatures, objects, etc. which can be recorded in video frames.

Also, in the described embodiments, each reference motion data frame and each motion data frame comprises optical flow vectors and a face vector. However, the face vector could be omitted, in which case the reference motion data frames and motion data frames would represent motion independent from any relative motion between the face of the subject and the camera used to record the reference video frames and video frames. Accordingly, step S12-72 of FIG. 12, at which a similarity metric for the face vector is calculated, would be omitted.

In the embodiments described above, at step S8-42 of FIG. 8, the motion data frame generation unit 360 generates a face vector indicating a change of position and size of a face of the subject between the first and second video frames. However, if, in a modified embodiment, the face vector is omitted from the reference motion data frames and the generated motion data frames, then step S8-42 could be omitted.

Also, in the described embodiments, the reference motion data frames are input to the video frame processing apparatus 300. However, instead, the reference motion data frames could be generated by video frame processing apparatus 300 by processing a sequence of reference video frames. In this case, the reference motion data frames would be generated in the same way as previously outlined with reference to FIG. 1A, and in the same way as the motion data frames are generated based on video frames of the subject at step S5-30.

Also, in the described embodiments, configuration data 236 is received by the configuration data reception unit 322 and stored in the configuration data store 324. However, instead, some or all of the configuration data 236 could be predetermined fixed configuration data which is pre-configured in the video frame processing apparatus 300, for example by programming the video frame processing apparatus with computer program instructions to implement the fixed configuration data. By way of example, the video frame processing apparatus could be programmed to implement reference frame rate data that defines a fixed frame rate which is assumed for all sequences of video frames and/or all sequences of reference motion data frames processed by the video frame processing apparatus 300. Additionally or alternatively, the video frame processing apparatus could be programmed to area segment configuration data that defines a required position and size for the face of a subject, and a positional configuration of area segments, which is used for all video frames processed by the video frame processing apparatus.

Also, in the described embodiments, the area segment configuration data defines a relative position and relative size of each area segment. However, instead, the area segment configuration data could define an absolute position and absolute size of each area segment by specifying the location and size of a block of pixels corresponding to each area segment, where the block of pixels is the same for each received video frame.

In the embodiments described above, at step S9-20 of FIG. 9, the motion data frame generation unit 360 detects a position and size of a face of the subject in the first video frame of a pair of video frames. However, if, in a modified embodiment, the area segment configuration data defines absolute positions and sizes of area segments, and the face vector is omitted from the reference motion data frames and the generated motion data frames, then step S9-20 could be omitted.

Furthermore, in the described embodiments, the area segments are defined relative to the face of the human subject. However, instead, the area segments could be defined relative to a different body part of a human subject. Furthermore, in some embodiments the subject may not be a human subject and the area segments could be defined relative to a part of the non-human subject.

Also, in the described embodiments, the area segment configuration data defines a grid of area segments comprising rows and columns of adjacent area segments. However, instead, the area segment configuration data could define individual area segments with respective positions and sizes, as shown in FIG. 1. More particularly, the defined individual area segments could be configured to be optimal for a particular reference motion.

Also, in the described embodiments, a user feedback unit 340 is included in the video frame processing apparatus 300 in order to ensure that the subject is correctly positioned for comparing the motion of the subject to the reference motion. However, the user feedback unit 340 is not essential and may be omitted. Correspondingly, the processing operations of steps S5-22, S5-24, S5-26 and S5-28 may be omitted from the processing operations performed by the video frame processing apparatus 300, and the required position and size for the face of the subject in a video frame to be processed would be omitted from the area segment configuration data. In this case, a similarity metric would be generated regardless of whether the subject is correctly positioned. Accordingly, the video frame processing apparatus 300 would generate a similarity metric which is equivalent to the above embodiment in the case that the subject is correctly positioned, and the video frame processing apparatus 300 would generate a similarity metric that indicates low similarity in the case that the subject is not correctly positioned such that the motion of the subject cannot be properly compared to the reference motion.

In the embodiments described above, at step S10-20 of FIG. 10A, the motion data frame generation unit divides the area segment in the first video frame selected by the area segment counter into motion windows and divides the corresponding area segment in the second video frame into corresponding motion windows. Steps S10-30 to S10-160 are then performed to generate a sum of optical flow vectors for motion windows of the pair of area segments. However, the dividing operation of step S10-20 could be omitted. Accordingly, steps S10-30, S10-40, S10-140, S10-150 and S10-160 would also be omitted, and the processing operations of steps S10-50 to S10-130 would be performed on the basis that each of the pair of area segments comprised one motion window.

In the embodiments described above, at step S10-20 of FIG. 10A, the size of a motion window is defined by a motionWindowWidth parameter which is part of the configuration of motion data frame generation unit 360. However, instead, the motionWindowWidth parameter may be defined by configuration data received by the configuration data reception unit 322. Alternatively, the motionWindowWidth parameter may be determined by video frame processing apparatus 300 according to a required rate of processing of pairs of video frames and a processing capacity of the video frame processing apparatus 300. In another alternative, the motionWindowWidth parameter may be determined by the motion data frame generation unit 360 relative to the size of an area segment which is to be divided into motion windows, so that the area segment is divided completely into a fixed number of motion windows. As a further alternative, the motionWindowWidth parameter may be a parameter which can be configured by a user by means of user inputs and instructions 238.

In the embodiments described above, at steps S10-50 to S10-130 of FIGS. 10A and 10B, an optical flow vector is calculated for a pair of corresponding motion windows using a Lucas-Kanade method. However, instead, other methods of calculating an optical flow vector for a pair of corresponding pixel blocks may be used, such as a Horn-Schunck method.

In the embodiments described above, at steps S10-70, S10-80 and S10-90 of FIG. 10A, if the pixels are colour pixels, the motion data frame generation unit 360 calculates each intensity change in the horizontal, vertical and time directions by performing a subtraction of the pixel values of the pixels in the red colour channel. However, each intensity change may instead be calculated by performing a subtraction in a blue colour channel, a green colour channel, or any other colour channel which may be included in pixel data of the received video frames. Furthermore, the motion data frame generation unit 360 may calculate an intensity change by performing a subtraction in more than one colour channel, and may combine the intensity changes for respective colour channels.

In the embodiments described above, at step S10-170 of FIG. 10B, the motion data frame generation unit 360 further divides a normalised sum of optical flow vectors by the size of the face. However, this further division at step S10-170 may be omitted, in particular if the area segment configuration data defines absolute positions and absolute sizes of the area segments, instead of defining relative positions and relative sizes of the area segments.

In the embodiments described above, at steps S12-40 and S12-72 of FIG. 12, the motion comparator 380 calculates a similarity metric contribution S based on the selected optical flow vectors $(u,v)_a$ and $(u,v)_b$ at step S12-40, and based on the face vectors at step S12-72. Then, at step S5-41, the motion comparator 380 calculates a similarity metric S by adding the calculated similarity metric contributions together and normalising the result. However, modified embodiments of the invention are possible in which a different method is used for calculating a similarity metric contribution and/or a different similarity metric is generated, as will now be explained with reference to FIGS. 14A, 14B, 14C, 14D and 14E, which each show a different example of a similarity metric generated based on the reference motion shown in FIG. 1A and the motion of a subject shown in FIG. 1B.

Figure 14A:
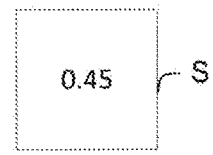
FIGS. 14A, 14B, 14C, 14D and 14E are schematic illustrations of a similarity metric in alternative embodiments.

FIG. 14A illustrates an exemplary similarity metric S generated by the above-described embodiment. The similarity metric S comprises a single scalar value indicating how similar the motion of the subject was to the reference motion. In the case of FIGS. 1A and 1B, the optical flow vectors 140-B and 140-D of reference motion data frames 130-1 and 130-2 are similar to the corresponding optical flow vectors of generated motion data frames 130-3 and 130-4, while the optical flow vectors 140-A and 140-C of reference motion data frames 130-1 and 130-2 are significantly different from the corresponding optical flow vectors of generated motion data frames 130-3 and 130-4, leading to a similarity metric of 0.45 on a scale from 0 to 1. In the above-described embodiment, step S13-10 is performed to add the similarity metric contributions S after the flow of FIG. 12 is completed. However, instead, the similarity metric S may be initialised with a value of 0 prior to the flow of FIG. 12, and each calculated similarity metric contribution S may be added to the similarity metric S after step S12-40 or S12-72 is performed.

Figure 14B:
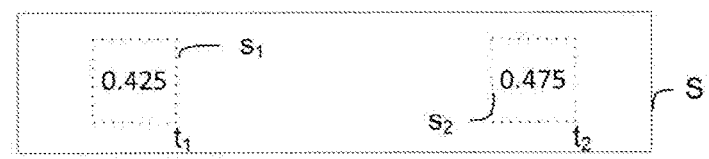

FIG. 14B illustrates an exemplary similarity metric S generated by a modified embodiment. In this modified embodiment, the similarity metric S is generated to comprise a plurality of values, $s_1$ and $s_2$, each corresponding to a respective reference motion data frame and generated reference motion data frame which have been compared. These values may be referred to as instant similarity metrics as they define a measure of the similarity of the motions at a given time instant. The similarity metric S is generated to further comprise an indication $t_1$, $t_2$, etc. for each instant similarity metric defining the temporal position of the instant similarity metric during the motion, and therefore to provide information about how the similarity of the motion of the subject to the reference motion varies at different times during the motion of the subject. Each indication t1, t2, etc. of temporal position may, for example, be generated from a motion data frame counter value. In the case of FIGS. 1A and 1B, instant similarity metric $s_1$ indicates the similarity between reference motion data frame 130-1 and generated motion data frame 130-3, and has a value 0.425, while instant similarity metric $s_2$ indicates the similarity between reference motion data frame 130-2 and generated motion data frame 130-4, and has a value 0.475, indicating that the similarity of generated motion data frame 130-4 to reference motion data frame 130-2 was greater than the similarity of generated motion data frame 130-3 to reference motion data frame 130-1. In this modified embodiment, the similarity metric contributions may be generated in accordance with FIG. 12 of the above-described embodiment. However, the method of generating the similarity metric in this modified embodiment is different from FIG. 13 of the above-described embodiment. More particularly, for each respective reference motion data frame and generated motion data frame, the motion comparator 380 adds together the similarity metric contributions calculated for the different optical flow vectors to generate an instant similarity metric, optionally normalises the instant similarity metric by dividing the instant similarity metric by the number of similarity metric contributions S which have contributed to the instant similarity metric, and generates the similarity metric to comprise the instant similarity metrics and an indication for each instant similarity metric of the time within the sequence of the instant similarity metric.

Figure 14C:
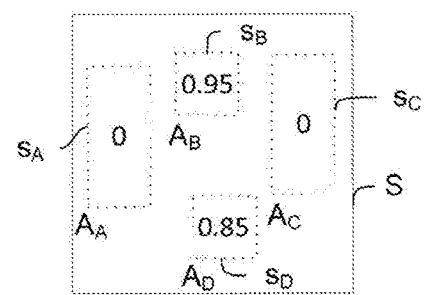

FIG. 14C illustrates an exemplary similarity metric S generated by another modified embodiment. In this modified embodiment, the similarity metric S is generated to comprise a plurality of values $s_A$, $s_B$, $s_C$ and $s_D$ each corresponding to a respective area segment of the area segment configuration data. These values may be referred to as local similarity metrics as they each define a measure of similarity of the motions in a local spatial area. The similarity metric S is generated to further comprise an indication $A_A$, $A_B$, $A_C$, $A_D$, etc. of the respective area segment associated with each local similarity metric, and therefore to provide information about how the similarity of the motion of the subject to the reference motion varies at different spatial areas of the video frames showing the motion of the subject. Each indication $A_1$, $A_2$, $A_3$, $A_4$, etc. of an area segment may, for example, be generated from an area segment counter value. In the case of FIGS. 1A and 1B, instant similarity metric $s_A$ indicates the similarity between reference motion in area segment 120-A between reference video frames 110-1, 110-2 and 110-3 and motion of the subject in video frames 110-4, 110-5 and 110-6, and has a value 0 because the hand and lower arm portions of human 112' in area segment 120-A move in opposite directions from the hand and lower arm portions of expert 112. Instant similarity metric $s_B$ indicates the similarity between reference motion in area segment 120-B between reference video frames 110-1, 110-2 and 110-3 and motion of the subject in video frames 110-4, 110-5 and 110-6, and has a value 0.95 because the reference motion of the expert is very similar to the motion of the subject in area segment 120-B. Instant similarity metric $s_C$ indicates the similarity between reference motion in area segment 120-C between reference video frames 110-1, 110-2 and 110-3 and motion of the subject in video frames 110-4, 110-5 and 110-6, and has a value 0 because the hand and lower arm portions of human 112' in area segment 120-C move in opposite directions from the hand and lower arm portions of expert 112. Instant similarity metric $s_D$ indicates the similarity between reference motion in area segment 120-D between reference video frames 110-1, 110-2 and 110-3 and motion of the subject in video frames 110-4, 110-5 and 110-6, and has a value 0.85 because the reference motion of the expert is highly similar to the motion of the subject in area segment 120-D. In this modified embodiment, the similarity metric contributions may be generated in accordance with FIG. 12 of the above-described embodiment. However, the method of generating the similarity metric in this modified embodiment is different from FIG. 13 of the above-described embodiment. More particularly, for each area segment of the area segment configuration, the motion comparator 380 adds together the similarity metric contributions calculated for the corresponding optical flow vectors to generate a local similarity metric, optionally normalises the local similarity metric by dividing the local similarity metric by the number of similarity metric contributions S which have contributed to the local similarity metric, and generates the similarity metric to comprise the local similarity metrics and an indication for each local similarity metric of the spatial area associated with the local similarity metric.

Figure 14D:
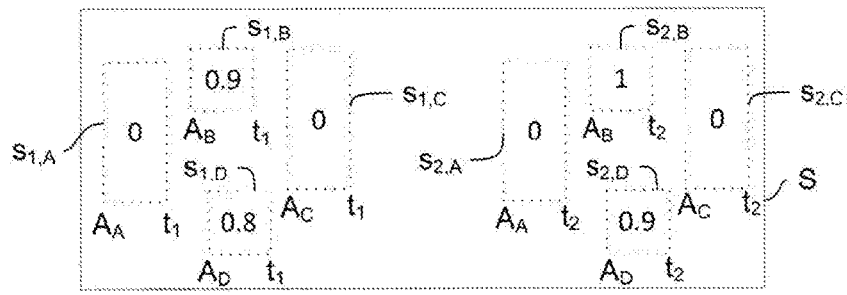

FIG. 14D illustrates an exemplary similarity metric S generated by another modified embodiment. In this modified embodiment, the similarity metric is generated to comprise the calculated similarity metric contributions $s_{1,A}$, $s_{1,B}$, $s_{1,C}$, $s_{1,D}$, $s_{2,A}$, $s_{2,B}$, $s_{2,C}$ and $s_{2,D}$ for each area segment in each pair of reference motion data and generated motion data frames which have been compared. The similarity metric S is generated to further comprise an indication of a time position $t_1$, $t_2$, etc. and an indication of an area segment $A_1$, $A_2$, $A_3$, $A_4$, etc. associated with each similarity metric contribution, to provide information about how the similarity of the motion of the subject to the reference motion varies at different times and at different spatial positions (area segments) of the video frames showing the motion of the subject. For example, the similarity metric may be generated to comprise a motion data frame counter value and an area segment counter value associated with each similarity metric contribution. FIG. 14D therefore illustrates a modified embodiment in which the individual similarity metric contributions are preserved in the similarity metric, along with their respective locations within the motion in terms of time and area segment. In this modified embodiment, the similarity metric contributions may be generated in accordance with FIG. 12 of the above-described embodiment. However, the method of generating the similarity metric in this modified embodiment is different from FIG. 13 of the above-described embodiment. More particularly, in this modified embodiment, no additional processing of the similarity metric contributions is required, and the motion comparator 380 generates the similarity metric to comprise a temporal position indicator $t_1$, $t_2$, etc. and a spatial position indicator $A_1$, $A_2$, $A_3$, $A_4$, etc. associated with the similarity metric contributions.

For the similarity metrics described above with respect to FIGS. 14A, 14B, 14C and 14D, each similarity metric contribution is a scalar value calculated according to equation (5). Accordingly, each similarity metric contribution defines a magnitude of the difference between the subject motion and the reference motion. However other methods of calculating the similarity metric contribution are possible. For example, the similarity metric contribution could be a scalar product according to equation (6):

$$s=(u,v)_a \cdot (u,v)_b \qquad (6)$$

Furthermore, each similarity metric contribution could instead be a vector. For example, each similarity metric contribution could be calculated as a vector according to equation (7):

$$s=(u,v)_a-(u,v)_b \qquad (7)$$

When calculated in this way, each similarity metric contribution defines both a magnitude and a direction of the difference between the subject motion and the reference motion.

Figure 14E:
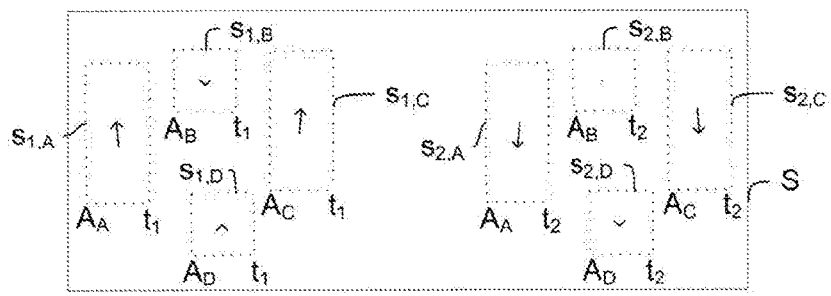

An exemplary similarity metric S calculated according to this alternative embodiment is illustrated in FIG. 14E. More particularly, FIG. 14E illustrates a similarity metric that is similar to the similarity metric previously described for FIG. 14D, except that each similarity metric contribution of the similarity metric is a vector calculated according to equation (7). Accordingly, in this alternative, vector differences between the motion of the subject and the reference motion can be identified from the similarity metric for different times during the motion and for different spatial positions.

In the embodiments described above, a single similarity metric is generated. However, a modified embodiment of the invention is possible in which more than one similarity metric is generated, as will now be explained with reference to FIGS. 15A and 15B.

Figure 15A:
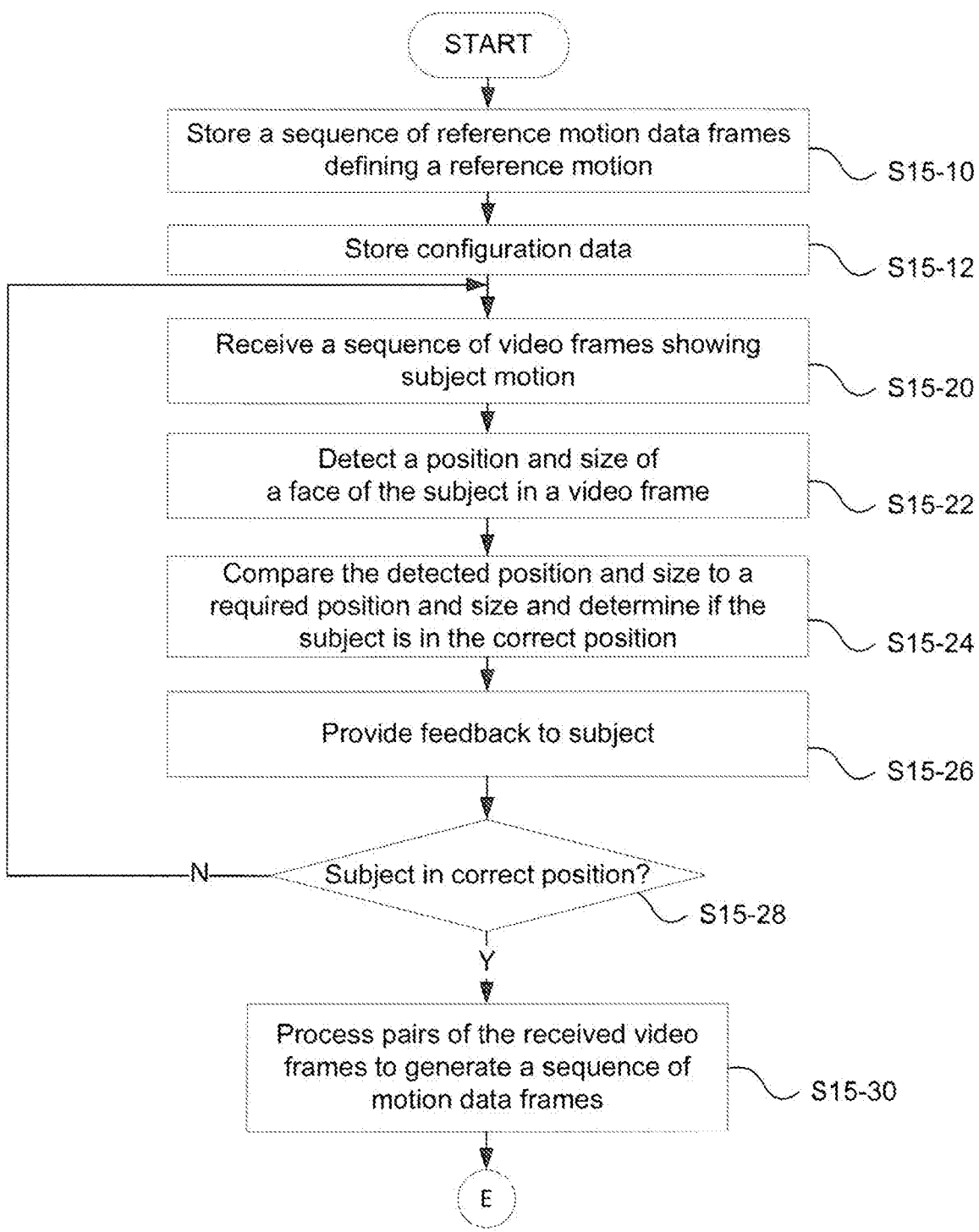
FIGS. 15A and 15B are flow diagrams showing the processing operations performed in a modified embodiment of the invention.
Figure 15B:
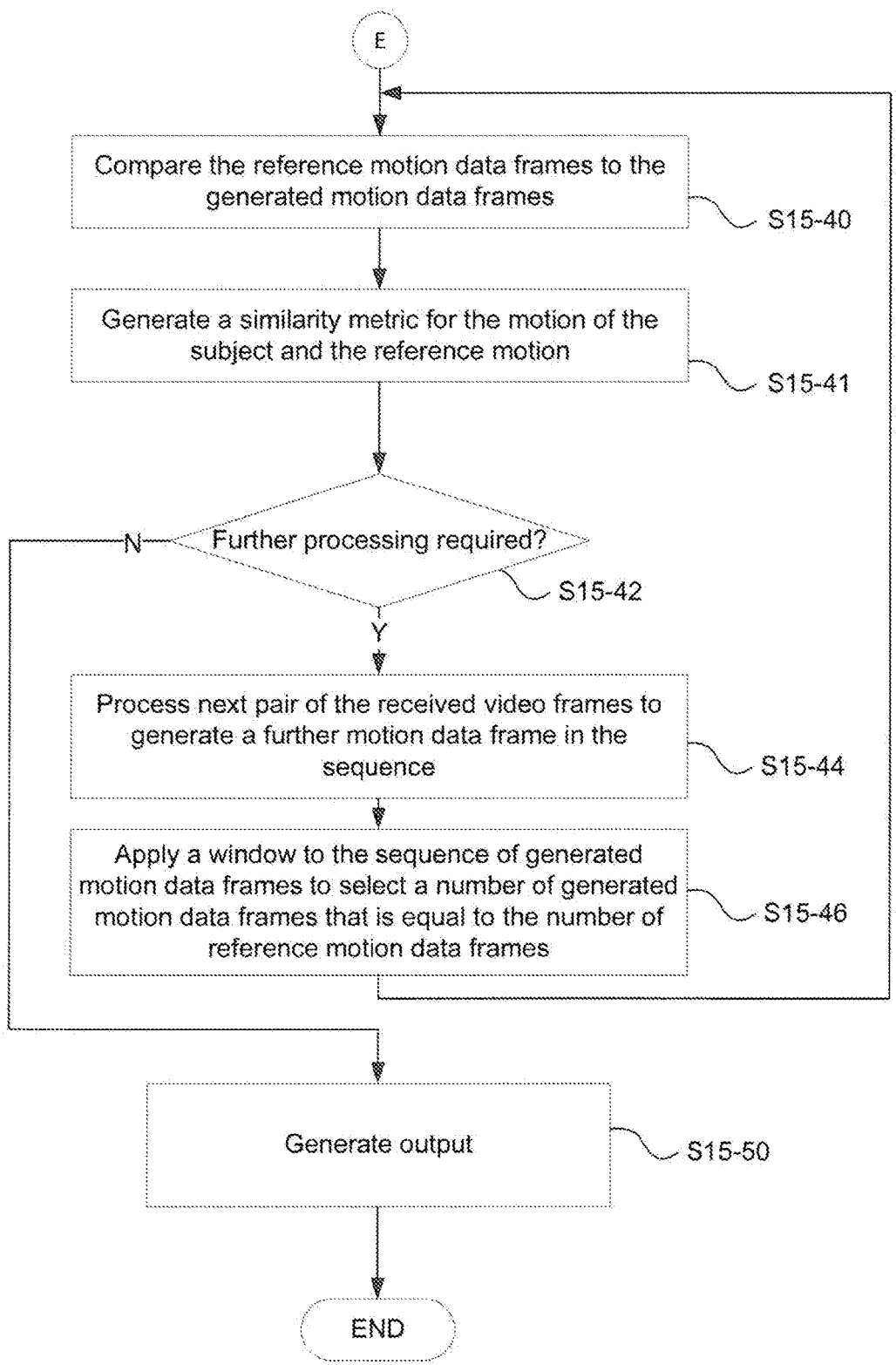

In the method of FIGS. 15A and 15B, steps S15-10, S15-12, S15-20, S15-22, S15-24, S15-26, S15-28, S15-30, S15-40 and S15-41 correspond respectively to steps S5-10, S5-12, S5-20, S5-22, S5-24, S5-26, S5-28, S5-30, S5-40 and S5-41 of FIG. 5, and will not be described again here for brevity.

However, the embodiment of FIGS. 15A and 15B differs from the embodiment of FIG. 5 in that, at step S15-42, the motion comparator 380 determines if further processing is required. In this embodiment, motion comparator 380 determines if further processing is required by determining if another video frame has been received which has not yet been processed to generate a motion data frame. However, the motion comparator 380 may determine if further processing is required in other ways, for example by detecting if a predetermined number of motion data frames have been generated or if a predetermined accuracy of a similarity metric has been generated.

If it is determined at step S15-42 that further processing is required, then the processing continues with step S15-44.

At step S15-44, the motion data frame generator 360 processes the next pair of received video frames to generate a further motion data frame in the sequence of generated motion data frames and to store the further motion data frame at the end of the sequence of motion data frames in the generated motion data frame store 370. The processing at step S15-44 is performed by the motion data frame generator 360 in the same way as the processing in steps S8-10 to S8-50.

At step S15-46, the motion comparator 380 applies a "window" to the sequence of generated motion data frames stored in the generated motion data frame store 370 to select a number of generated motion data frames that is equal to the number of reference motion data frames stored in the reference motion data frame store 320.

More particularly, as a result of the processing at step S15-44, a sequence of motion data frames has been generated which contains more motion data frames than the number of reference motion data frames in the reference motion data frame store 320. The motion comparator 380 therefore selects a subset of the generated motion data frames that is equal to the number of reference motion data frames, in order to have one generated motion data frame to compare to each reference motion data frame. This selection is performed at step S15-46 by selecting a continuous sub-sequence, or "window", of the sequence of motion data frames stored in the generated motion data frame store 370. This window is applied so as to include the last motion data frame generated at step S15-44 and to exclude the first motion data frame in the previous window (or, in the case of the first time that step S15-46 is performed, the window is applied so as to exclude the first generated motion data frame compared in step S15-40). Therefore, upon each iteration of step S15-46, the motion comparator 380 moves the window by one motion data frame so as to apply a moving window to ensure that a different respective subset of motion data frames is selected each time.

After step S15-46, processing returns to step S15-40, at which the motion comparator 380 compares the reference motion data frames to the generated motion data frames selected by the "window", and at step S15-41 the motion comparator 380 generates a similarity metric for the window of generated motion data frames and the reference motion data frames. This similarity metric measures the similarity of the reference motion to the motion of the subject in the applied "window".

On the other hand, if it is determined at step S15-42 that no further processing is required, then processing proceeds to step S15-50, in which the output generator 394 generates an output. This output may comprise a single one of the similarity metrics generated at the one or more iterations of step S15-40, in accordance with the previously described output at step S5-50. Alternatively or additionally, the output may comprise all of the generated similarity metrics, or may comprise a statistic for the generated similarity metrics such as a maximum similarity metric or an average similarity metric. In a further additional or alternative output, the output may comprise a visual output to be displayed on display device 246, the visual output being, for example, a graph of the generated similarity metrics plotted against a time axis.

Repeating steps S15-40, S15-44 and S15-46 has the effect of comparing motion recorded in different portions of the sequence of received video frames to the reference motion, and has the further effect that, even if the subject does not start a motion at a known time, it is still possible to compare the motion of the subject to the reference motion. It may then be assumed that the largest generated similarity metric was generated for the time when the subject performs a motion, and this largest similarity metric is an indicator of the similarity of the subject's motion to the reference motion.

In FIG. 15, steps S15-44, S15-46 and S15-40 are performed in sequence. However, this processing could be arranged differently, so that the processing in step S15-44 and, optionally, S15-46 is performed in parallel with the processing at step S15-40 for the previous "window" of generated motion data frames.

As a further modification, in the embodiments described above, at step S5-50 of FIG. 5, the output generator 394 may generate an output which comprises the generated similarity metric(s). Also, in the described embodiments, the motion comparator 380 compares a sequence of reference motion data frames to a sequence of generated motion data frames and generates a similarity metric. However, instead, the motion comparator could compare one reference motion data frame to one generated motion data frame and generate a similarity metric.

For example, the one reference motion data frame could correspond to a first reference video frame and last reference video frame in a sequence of reference video frames showing a reference motion. In this case, the reference motion data frame reception unit 310 could receive and store the one reference motion data frame instead of receiving and storing a sequence of reference motion data frames.

Alternatively, the motion comparator 380 could compare one reference motion data frame stored in the reference motion data frame store 320 to each of a plurality of generated motion data frames stored in the generated motion data frame store 370 and generate a similarity metric for each comparison. More particularly, the motion comparator 380 could compare a first one of the sequence of reference motion data frames to successive generated motion data frames one-at-a-time until the corresponding similarity metric is above a threshold indicating that the subject has started to imitate the reference motion. Then, the motion comparator 380 could compare the second reference motion data frame to the first subsequent generated motion data frame in the sequence of generated motion data frames and generate a second similarity metric, compare the third reference motion data frame to the second subsequent generated motion data frame and generate a third similarity metric, and so on. In this way, the motion comparator would compare the reference motion to the motion of the subject after it is detected that the motion of the subject begins.

As a further alternative, the reference motion data frame reception unit 310 could receive and store an unordered or incomplete set of reference motion data frames, such that the order of the reference motion data frames may not correspond to the order of motion data frames generated by motion data frame generation unit 360. In this case, the motion comparator 380 would compare a generated motion data frame to multiple reference motion data frames and generate a respective similarity metric for each comparison. The similarity metrics could then be compared against a threshold to determine if the subject's motion defined by the generated motion data frame matches reference motion defined by a reference motion data frame. This process could then be repeated to compare each subsequent generated motion data frame with all of the reference motion data frames which have not yet been matched. It would then be determined that the subject's motion matches the reference motion if each respective reference motion data frame (or each of a predetermined number of the reference motion data frames) matches a respective generated motion data frame. Furthermore, if a time length of the reference motion is known, it could be determined that the subject's motion matches the reference motion only if the reference motion data frames are matched to motion data frames that were generated from received video frames corresponding to the same time length. This could also be achieved by each of a sequence of generated motion data frames corresponding to the time length with each of the set of reference motion data frames. As a variation on this alternative, instead of determining if the subject's motion defined by the generated motion data frame matches reference motion defined by a reference motion data frame and repeating the process to compare each subsequent generated motion data frame with all of the reference motion data frames which have not yet been matched, the motion comparator could instead determine the similarity of the generated motion data frame to all of the reference motion data frames and repeat the process to compare each subsequent generated motion data frame with all of the reference motion data frames. Accordingly, a best-similarities fit could be determined for the unordered or incomplete set of reference motion data frames and the generated motion data frames. In this way, an estimate could be determined of the similarity of the subject motion shown in the sequence of generated motion data frames to a reference motion which was originally shown by an ordered, complete sequence of reference motion data frames from which the unordered or incomplete sequence of reference motion data frames was derived, or, alternatively, an estimate could be determined of the ordered, complete sequence of reference motion data frames.

Other modifications are also possible.

The invention claimed is:

1. A method of processing a sequence of video frames showing motion of a subject to compare the motion of the subject with a reference motion, the method comprising:
   storing at least one reference motion data frame defining a reference motion, each reference motion data frame corresponding to respective first and second reference video frames in a sequence of video frames showing the reference motion and comprising a plurality of optical flow vectors, each optical flow vector corresponding to a respective area segment defined in the first reference video frame and a corresponding area segment defined in the second reference video frame and defining optical flow between the area segment defined in the first reference video frame and the area segment defined in the second reference video frame;

receiving a sequence of video frames to be processed;

processing at least one pair of the received video frames to generate a motion data frame defining motion of a subject between the pair of received video frames, wherein each pair of the received video frames that is processed is processed by:
- for each area segment of the reference video frames, determining a corresponding area segment in a first video frame of the pair and a corresponding area segment in a second video frame of the pair;
- for each determined pair of corresponding area segments, comparing the area segments and generating an optical flow vector defining optical flow between the area segments; and
- generating a motion data frame for the pair of received video frames, the motion data frame comprising the optical flow vectors generated for the determined pairs of corresponding area segments;

comparing the at least one reference motion data frame defining the reference motion to the at least one generated motion data frames defining the motion of the subject; and generating a similarity metric for the motion of the subject and the reference motion, wherein generating each optical flow vector defining optical flow between each pair of corresponding area segments in the first and second video frames comprises:
- dividing the area segment in the first video frame into motion windows and dividing the corresponding area segment in the second video frame into corresponding motion windows to create pairs of corresponding motion windows;
- calculating an optical flow vector for each pair of corresponding motion windows; and
- calculating the optical flow vector for the pair of corresponding area segments by combining the optical flow vectors calculated for the pairs of corresponding motion windows in the pair of area segments.

2. A method according to claim 1, further comprising storing area segment configuration data defining a configuration of the area segments in the reference video frames.

3. A method according to claim 1, wherein:
a sequence of reference motion data frames is stored defining the reference motion;
processing at least one pair of the received video frames to generate a motion data frame defining motion of the subject between the pair of received video frames comprises processing respective pairs of the received video frames to generate a sequence of motion data frames defining motion of the subject in the received sequence of video frames; and
comparing the at least one reference motion data frame to the at least one generated motion data frame defining motion of the subject comprises comparing the reference motion data frames to a plurality of the generated motion data frames.

4. A method of processing a sequence of video frames showing motion of a subject to compare the motion of the subject with a reference motion, the method comprising:
storing at least one reference motion data frame defining a reference motion, each reference motion data frame corresponding to respective first and second reference video frames in a sequence of video frames showing the reference motion and comprising a plurality of optical flow vectors, each optical flow vector corresponding to a respective area segment defined in the first reference video frame and a corresponding area segment defined in the second reference video frame and defining optical flow between the area segment defined in the first reference video frame and the area segment defined in the second reference video frame;

receiving a sequence of video frames to be processed;

processing at least one pair of the received video frames to generate a motion data frame defining motion of a subject between the pair of received video frames, wherein each pair of the received video frames that is processed is processed by:
- for each area segment of the reference video frames, determining a corresponding area segment in a first video frame of the pair and a corresponding area segment in a second video frame of the pair;
- for each determined pair of corresponding area segments, comparing the area segments and generating an optical flow vector defining optical flow between the area segments; and
- generating a motion data frame for the pair of received video frames, the motion data frame comprising the optical flow vectors generated for the determined pairs of corresponding area segments;

comparing the at least one reference motion data frame defining the reference motion to the at least one generated motion data frames defining the motion of the subject;

generating a similarity metric for the motion of the subject and the reference motion; and storing area segment configuration data defining a configuration of the area segments in the reference video frames, wherein determining a corresponding area segment in the first and second video frames of each pair of video frames to be processed for each area segment of the reference video frames comprises:
detecting a respective position of a reference part of the subject in each of the pair of video frames; and
determining a respective area segment in each of the pair of video frames relative to the position of the detected reference part, according to the stored area segment configuration data.

5. A method according to claim 4, wherein the subject comprises a human user and the reference part is a face of the user.

6. A method according to claim 5, wherein the sequence of video frames is received from a camera, and the method further comprises:
i) detecting a position and size of the face in a video frame of the sequence of video frames;
ii) comparing the detected position and size to a required position and size for comparing the motion of the subject to the reference motion;
iii) in dependence upon the result of the comparison, providing feedback to the human user to adjust their position relative to the camera; and repeating processes i)-iii) until the required position and size is detected.

7. A method according to claim 6, wherein the required position and size is a position and size which results in the determined area segments all being located within each video frame of the pair being processed.

8. A method of processing a sequence of video frames showing motion of a subject to compare the motion of the subject with a reference motion, the method comprising:
  storing at least one reference motion data frame defining a reference motion, each reference motion data frame corresponding to respective first and second reference video frames in a sequence of video frames showing the reference motion and comprising a plurality of optical flow vectors, each optical flow vector corresponding to a respective area segment defined in the first reference video frame and a corresponding area segment defined in the second reference video frame and defining optical flow between the area segment defined in the first reference video frame and the area segment defined in the second reference video frame;
  receiving a sequence of video frames to be processed;
  processing at least one pair of the received video frames to generate a motion data frame defining motion of a subject between the pair of received video frames, wherein each pair of the received video frames that is processed is processed by:
    for each area segment of the reference video frames, determining a corresponding area segment in a first video frame of the pair and a corresponding area segment in a second video frame of the pair;
    for each determined pair of corresponding area segments, comparing the area segments and generating an optical flow vector defining optical flow between the area segments; and
    generating a motion data frame for the pair of received video frames, the motion data frame comprising the optical flow vectors generated for the determined pairs of corresponding area segments;
  comparing the at least one reference motion data frame defining the reference motion to the at least one generated motion data frames defining the motion of the subject;
  generating a similarity metric for the motion of the subject and the reference motion; and
  storing area segment configuration data defining a configuration of the area segments in the reference video frames,
  wherein determining a corresponding area segment in the first and second video frames of each pair of video frames to be processed for each area segment of the reference video frames comprises:
    detecting a respective position of a reference part of the subject in each of the pair of video frames;
    detecting a respective size of the reference part of the subject in each of the pair of video frames; and
    determining a respective area segment in each of the pair of video frames with a position and size relative to the position and size of the detected reference part, according to the stored area segment configuration data.

9. A method of processing a sequence of video frames showing motion of a subject to compare the motion of the subject with a reference motion, the method comprising:
  storing at least one reference motion data frame defining a reference motion, each reference motion data frame corresponding to respective first and second reference video frames in a sequence of video frames showing the reference motion and comprising a plurality of optical flow vectors, each optical flow vector corresponding to a respective area segment defined in the first reference video frame and a corresponding area segment defined in the second reference video frame and defining optical flow between the area segment defined in the first reference video frame and the area segment defined in the second reference video frame;
  receiving a sequence of video frames to be processed;
  processing at least one pair of the received video frames to generate a motion data frame defining motion of a subject between the pair of received video frames, wherein each pair of the received video frames that is processed is processed by:
    for each area segment of the reference video frames, determining a corresponding area segment in a first video frame of the pair and a corresponding area segment in a second video frame of the pair;
    for each determined pair of corresponding area segments, comparing the area segments and generating an optical flow vector defining optical flow between the area segments; and
    generating a motion data frame for the pair of received video frames, the motion data frame comprising the optical flow vectors generated for the determined pairs of corresponding area segments;
  comparing the at least one reference motion data frame defining the reference motion to the at least one generated motion data frames defining the motion of the subject; and
  generating a similarity metric for the motion of the subject and the reference motion,
  wherein a sequence of reference motion data frames is stored defining the reference motion;
  processing at least one pair of the received video frames to generate a motion data frame defining motion of the subject between the pair of received video frames comprises processing respective pairs of the received video frames to generate a sequence of motion data frames defining motion of the subject in the received sequence of video frames; and
  comparing the at least one reference motion data frame to the at least one generated motion data frame defining motion of the subject comprises comparing the reference motion data frames to a plurality of the generated motion data frames,
  wherein the plurality of motion data frames which is compared to the reference motion data frames has a number of motion data frames that is equal to the number of reference motion data frames, the comparison being performed by:
  comparing each optical flow vector of each motion data frame of the reference motion data frames to a corresponding optical flow vector of a corresponding motion data frame of the generated motion data frames.

10. A method according to claim 9, wherein:
  each optical flow vector of each motion data frame of the reference motion data frames is compared to a corresponding optical flow vector of a corresponding motion data frame of the generated motion data frames to calculate a respective similarity metric contribution; and
  the similarity metric is generated using the calculated similarity metric contributions;
  wherein each calculated similarity metric contribution is either a scalar product of the respective optical flow vector in the reference motion data frame and the corresponding optical flow vector in the generated motion data frame or a vector difference between the respective optical flow vector in the reference motion data frame and the corresponding optical flow vector in the generated motion data frame.

11. A method according to claim 10, wherein
the calculated similarity metric contributions are vector differences; and
the similarity metric is generated to comprise the respective calculated similarity metric contributions, and an indication of at least one of a time position and an area segment associated with each similarity metric contribution.

12. A method according to claim 10, wherein
the calculated similarity metric contributions are scalar products;
the similarity metric is generated by, for each area segment of the reference video frames, adding the calculated similarity metric contributions corresponding to the area segment to generate a local similarity metric for the motion of the subject and the reference motion within the area segment; and
the similarity metric is generated to comprise the local similarity metrics, and an indication of an area segment associated with each local similarity metric.

13. A method according to claim 9, wherein the number of generated motion data frames is greater than the number of reference motion data frames, and the method further comprises, after generating the similarity metric, generating at least one further similarity metric, each further similarity metric being generated by:
applying a window to the sequence of generated motion data frames to select a number of generated motion data frames that is equal to the number of reference motion data frames such that the window of motion data frames includes at least one motion data frame that was not previously used to generate a similarity metric; and
comparing each optical flow vector of each motion data frame of the reference motion data frames to a corresponding optical flow vector of a corresponding motion data frame of the window of motion data frames.

14. Video frame processing apparatus configured to process a sequence of video frames showing motion of a subject to compare the motion of the subject with a reference motion, the video frame processing apparatus comprising:
a reference motion data frame store configured to store at least one reference motion data frame defining a reference motion, each reference motion data frame corresponding to respective first and second reference video frames and comprising a plurality of optical flow vectors, each optical flow vector corresponding to a respective area segment defined in the first reference video frame and a corresponding area segment defined in the second reference video frame and defining optical flow between the area segment defined in the first reference video frame and the area segment defined in the second reference video frame;
a video data reception unit configured to receive a sequence of video frames to be processed;
a motion data frame generation unit configured to process at least one pair of the received video frames to generate a motion data frame defining motion of a subject between the pair of received video frames, the motion data frame generation unit being configured to process each pair of received video frames that is processed by:
for each area segment of the reference video frames, determining a corresponding area segment in a first video frame of the pair and a corresponding area segment in a second video frame of the pair;
for each determined pair of corresponding area segments, comparing the area segments and generating an optical flow vector defining optical flow between the area segments; and
generating a motion data frame for the pair of received video frames, the motion data frame comprising the optical flow vectors generated for the determined pairs of corresponding area segments;
a motion comparator configured to compare the at least one reference motion data frame defining the reference motion to the at least one generated motion data frame defining the motion of the subject,
wherein the motion comparator is further configured to generate a similarity metric for the motion of the subject and the reference motion,
wherein the motion data frame generation unit is configured to generate each optical flow vector defining optical flow between each respective pair of corresponding area segments in the first and second video frames by:
dividing the area segment in the first video frame into motion windows and dividing the corresponding area segment in the second video frame into corresponding motion windows to create pairs of corresponding motion windows;
calculating an optical flow vector for each pair of corresponding motion windows; and
calculating the optical flow vector for the pair of corresponding area segments by combining the optical flow vectors calculated for the pairs of corresponding motion windows in the pair of area segments.

15. Video frame processing apparatus according to claim 14, further comprising an area segment configuration data store configured to store area segment configuration data defining a configuration of the area segments in the reference video frames.

16. Video frame processing apparatus according to claim 14, wherein:
the reference motion data frame store is configured to store a sequence of reference motion data frames defining the reference motion;
the motion data frame generation unit is configured to process respective pairs of the received video frames to generate a sequence of motion data frames defining motion of the subject in the received sequence of video frames; and
the motion comparator is configured to compare the reference motion data frames to a plurality of the generated motion data frames.

17. Video frame processing apparatus configured to process a sequence of video frames showing motion of a subject to compare the motion of the subject with a reference motion, the video frame processing apparatus comprising:
a reference motion data frame store configured to store at least one reference motion data frame defining a reference motion, each reference motion data frame corresponding to respective first and second reference video frames and comprising a plurality of optical flow vectors, each optical flow vector corresponding to a respective area segment defined in the first reference video frame and a corresponding area segment defined in the second reference video frame and defining optical flow between the area segment defined in the first reference video frame and the area segment defined in the second reference video frame;

a video data reception unit configured to receive a sequence of video frames to be processed;

a motion data frame generation unit configured to process at least one pair of the received video frames to generate a motion data frame defining motion of a subject between the pair of received video frames, the motion data frame generation unit being configured to process each pair of received video frames that is processed by:

for each area segment of the reference video frames, determining a corresponding area segment in a first video frame of the pair and a corresponding area segment in a second video frame of the pair;

for each determined pair of corresponding area segments, comparing the area segments and generating an optical flow vector defining optical flow between the area segments; and generating a motion data frame for the pair of received video frames, the motion data frame comprising the optical flow vectors generated for the determined pairs of corresponding area segments;

a motion comparator configured to compare the at least one reference motion data frame defining the reference motion to the at least one generated motion data frame defining the motion of the subject, wherein the motion comparator is further configured to generate a similarity metric for the motion of the subject and the reference motion, further comprising an area segment configuration data store configured to store area segment configuration data defining a configuration of the area segments in the reference video frames, wherein the motion data frame generation unit is configured to determine a corresponding area segment in the first and second video frames of each pair of video frames to be processed for each area segment of the reference video frames by:

detecting a respective position of a reference part of the subject in each of the pair of video frames; and determining a respective area segment in each of the pair of video frames relative to the position of the detected reference part, according to the stored area segment configuration data.

18. Video frame processing apparatus according to claim 17, wherein the subject comprises a human user and the reference part is a face of the user.

19. Video frame processing apparatus according to claim 18, wherein:

the video data reception unit is configured to receive the sequence of video frames to be processed from a camera; and the video frame processing apparatus further comprising a user feedback unit configured to:

i) detect a position and size of the face in a video frame of the sequence of video frames;

ii) compare the detected position and size to a required position and size for comparing the motion of the subject to the reference motion;

iii) in dependence upon the result of the comparison, provide feedback to the human user to adjust their position relative to the camera; and repeat processes i)-iii) until the required position and size is detected.

20. Video frame processing apparatus according to claim 19, wherein the required position and size is a position and size which results in the determined area segments all being located within each video frame of the pair being processed.

21. Video frame processing apparatus configured to process a sequence of video frames showing motion of a subject to compare the motion of the subject with a reference motion, the video frame processing apparatus comprising:

a reference motion data frame store configured to store at least one reference motion data frame defining a reference motion, each reference motion data frame corresponding to respective first and second reference video frames and comprising a plurality of optical flow vectors, each optical flow vector corresponding to a respective area segment defined in the first reference video frame and a corresponding area segment defined in the second reference video frame and defining optical flow between the area segment defined in the first reference video frame and the area segment defined in the second reference video frame;

a video data reception unit configured to receive a sequence of video frames to be processed;

a motion data frame generation unit configured to process at least one pair of the received video frames to generate a motion data frame defining motion of a subject between the pair of received video frames, the motion data frame generation unit being configured to process each pair of received video frames that is processed by:

for each area segment of the reference video frames, determining a corresponding area segment in a first video frame of the pair and a corresponding area segment in a second video frame of the pair;

for each determined pair of corresponding area segments, comparing the area segments and generating an optical flow vector defining optical flow between the area segments; and generating a motion data frame for the pair of received video frames, the motion data frame comprising the optical flow vectors generated for the determined pairs of corresponding area segments;

a motion comparator configured to compare the at least one reference motion data frame defining the reference motion to the at least one generated motion data frame defining the motion of the subject, wherein the motion comparator is further configured to generate a similarity metric for the motion of the subject and the reference motion, further comprising an area segment configuration data store configured to store area segment configuration data defining a configuration of the area segments in the reference video frames, wherein the motion data frame generation unit is configured to determine a corresponding area segment in the first and second video frames of each pair of video frames to be processed for each area segment of the reference video frames by:

detecting a respective position of a reference part of the subject in each of the pair of video frames;

detecting a respective size of the reference part of the subject in each of the pair of video frames; and determining a respective area segment in each of the pair of video frames with a position and size relative to the position and size of the detected reference part, according to the stored area segment configuration data.

22. Video frame processing apparatus configured to process a sequence of video frames showing motion of a subject to compare the motion of the subject with a reference motion, the video frame processing apparatus comprising:

a reference motion data frame store configured to store at least one reference motion data frame defining a reference motion, each reference motion data frame corresponding to respective first and second reference video frames and comprising a plurality of optical flow vectors, each optical flow vector corresponding to a respective area segment defined in the first reference video frame and a corresponding area segment defined in the second reference video frame and defining optical flow between the area segment defined in the first reference video frame and the area segment defined in the second reference video frame;

a video data reception unit configured to receive a sequence of video frames to be processed;

a motion data frame generation unit configured to process at least one pair of the received video frames to generate a motion data frame defining motion of a subject between the pair of received video frames, the motion data frame generation unit being configured to process each pair of received video frames that is processed by:
 for each area segment of the reference video frames, determining a corresponding area segment in a first video frame of the pair and a corresponding area segment in a second video frame of the pair;
 for each determined pair of corresponding area segments, comparing the area segments and generating an optical flow vector defining optical flow between the area segments; and
 generating a motion data frame for the pair of received video frames, the motion data frame comprising the optical flow vectors generated for the determined pairs of corresponding area segments;

a motion comparator configured to compare the at least one reference motion data frame defining the reference motion to the at least one generated motion data frame defining the motion of the subject, wherein the motion comparator is further configured to generate a similarity metric for the motion of the subject and the reference motion, the reference motion data frame store is configured to store a sequence of reference motion data frames defining the reference motion;

the motion data frame generation unit is configured to process respective pairs of the received video frames to generate a sequence of motion data frames defining motion of the subject in the received sequence of video frames; and the motion comparator is configured to compare the reference motion data frames to a plurality of the generated motion data frames wherein the motion comparator is configured to compare the reference motion data frames to a number of motion data frames defining the motion of the subject that is equal to the number of reference motion data frames; and the motion comparator is configured to compare the reference motion data frames to the motion data frames by comparing each optical flow vector of each motion data frame of the reference motion data frames to a corresponding optical flow vector of a corresponding motion data frame of the generated motion data frames.

23. A video frame processing apparatus according to claim 22, wherein:
 the motion comparator is configured to compare each optical flow vector of each motion data frame of the reference motion data frames to a corresponding optical flow vector of a corresponding motion data frame of the generated motion data frames to calculate a respective similarity metric contribution; and
 the motion comparator is configured to generate the similarity metric using the calculated similarity metric contributions;
 wherein each calculated similarity metric contribution is either a scalar product of the respective optical flow vector in the reference motion data frame and the corresponding optical flow vector in the generated motion data frame or a vector difference between the respective optical flow vector in the reference motion data frame and the corresponding optical flow vector in the generated motion data frame.

24. Video frame processing apparatus according to claim 23, wherein
 the calculated similarity metric contributions are vector differences; and
 the motion comparator is configured to generate the similarity metric to comprise the respective calculated similarity metric contributions, and an indication of at least one of a time position and an area segment associated with each similarity metric contribution.

25. Video frame processing apparatus according to claim 23, wherein
 the calculated similarity metric contributions are scalar products;
 the motion comparator is configured to generate the similarity metric by, for each area segment of the reference video frames, adding the calculated similarity metric contributions corresponding to the area segment to generate a local similarity metric for the motion of the subject and the reference motion within the area segment; and
 the similarity metric is generated to comprise the local similarity metrics, and an indication of an area segment associated with each local similarity metric.

26. A video frame processing apparatus according to claim 22, wherein:
 the motion data frame generation unit is configured to generate a number of motion data frames that is greater than the number of reference motion data frames; and
 the motion comparator is further configured to, after generating the similarity metric, generate at least one further similarity metric by:
 applying a window to the sequence of generated motion data frames to select a number of generated motion data frames that is equal to the number of reference motion data frames such that the window of motion data frames includes at least one motion data frame that was not previously used to generate a similarity metric; and
 comparing each optical flow vector of each motion data frame of the reference motion data frames to a corresponding optical flow vector of a corresponding motion data frame of the window of motion data frames.

27. A non-transitory storage device storing program instructions which, when executed by a programmable processing apparatus, cause the processing apparatus to execute a method comprising:
 storing at least one reference motion data frame defining a reference motion, each reference motion data frame corresponding to respective first and second reference video frames in a sequence of video frames showing the reference motion and comprising a plurality of optical flow vectors, each optical flow vector corresponding to a respective area segment defined in the first reference video frame and a corresponding area segment defined in the second reference video frame and defining optical flow between the area segment defined in the first reference video frame and the area segment defined in the second reference video frame;

receiving a sequence of video frames to be processed;

processing at least one pair of the received video frames to generate a motion data frame defining motion of a subject between the pair of received video frames, wherein each pair of the received video frames that is processed is processed by:

for each area segment of the reference video frames, determining a corresponding area segment in a first video frame of the pair and a corresponding area segment in a second video frame of the pair;

for each determined pair of corresponding area segments, comparing the area segments and generating an optical flow vector defining optical flow between the area segments; and generating a motion data frame for the pair of received video frames, the motion data frame comprising the optical flow vectors generated for the determined pairs of corresponding area segments;

comparing the at least one reference motion data frame defining the reference motion to the at least one generated motion data frames defining the motion of the subject; and generating a similarity metric for the motion of the subject and the reference motion, wherein generating each optical flow vector defining optical flow between each pair of corresponding area segments in the first and second video frames comprises:

dividing the area segment in the first video frame into motion windows and dividing the corresponding area segment in the second video frame into corresponding motion windows to create pairs of corresponding motion windows;

calculating an optical flow vector for each pair of corresponding motion windows; and calculating the optical flow vector for the pair of corresponding area segments by combining the optical flow vectors calculated for the pairs of corresponding motion windows in the pair of area segments.

28. A non-transitory storage device storing program instructions which, when executed by a programmable processing apparatus, cause the processing apparatus to execute a method comprising:

storing at least one reference motion data frame defining a reference motion, each reference motion data frame corresponding to respective first and second reference video frames in a sequence of video frames showing the reference motion and comprising a plurality of optical flow vectors, each optical flow vector corresponding to a respective area segment defined in the first reference video frame and a corresponding area segment defined in the second reference video frame and defining optical flow between the area segment defined in the first reference video frame and the area segment defined in the second reference video frame;

receiving a sequence of video frames to be processed;

processing at least one pair of the received video frames to generate a motion data frame defining motion of a subject between the pair of received video frames, wherein each pair of the received video frames that is processed is processed by:

for each area segment of the reference video frames, determining a corresponding area segment in a first video frame of the pair and a corresponding area segment in a second video frame of the pair;

for each determined pair of corresponding area segments, comparing the area segments and generating an optical flow vector defining optical flow between the area segments; and generating a motion data frame for the pair of received video frames, the motion data frame comprising the optical flow vectors generated for the determined pairs of corresponding area segments;

comparing the at least one reference motion data frame defining the reference motion to the at least one generated motion data frames defining the motion of the subject;

generating a similarity metric for the motion of the subject and the reference motion; and storing area segment configuration data defining a configuration of the area segments in the reference video frames, wherein determining a corresponding area segment in the first and second video frames of each pair of video frames to be processed for each area segment of the reference video frames comprises:

detecting a respective position of a reference part of the subject in each of the pair of video frames; and determining a respective area segment in each of the pair of video frames relative to the position of the detected reference part, according to the stored area segment configuration data.

29. A non-transitory storage device storing program instructions which, when executed by a programmable processing apparatus, cause the processing apparatus to execute a method comprising:

storing at least one reference motion data frame defining a reference motion, each reference motion data frame corresponding to respective first and second reference video frames in a sequence of video frames showing the reference motion and comprising a plurality of optical flow vectors, each optical flow vector corresponding to a respective area segment defined in the first reference video frame and a corresponding area segment defined in the second reference video frame and defining optical flow between the area segment defined in the first reference video frame and the area segment defined in the second reference video frame;

receiving a sequence of video frames to be processed;

processing at least one pair of the received video frames to generate a motion data frame defining motion of a subject between the pair of received video frames, wherein each pair of the received video frames that is processed is processed by:

for each area segment of the reference video frames, determining a corresponding area segment in a first video frame of the pair and a corresponding area segment in a second video frame of the pair;

for each determined pair of corresponding area segments, comparing the area segments and generating an optical flow vector defining optical flow between the area segments; and generating a motion data frame for the pair of received video frames, the motion data frame comprising the optical flow vectors generated for the determined pairs of corresponding area segments;

comparing the at least one reference motion data frame defining the reference motion to the at least one generated motion data frames defining the motion of the subject;

generating a similarity metric for the motion of the subject and the reference motion; and storing area segment configuration data defining a configuration of the area segments in the reference video frames, wherein determining a corresponding area segment in the first and second video frames of each pair of video frames to be processed for each area segment of the reference video frames comprises:

detecting a respective position of a reference part of the subject in each of the pair of video frames;

detecting a respective size of the reference part of the subject in each of the pair of video frames; and determining a respective area segment in each of the pair of video frames with a position and size relative to the position and size of the detected reference part, according to the stored area segment configuration data.

30. A non-transitory storage device storing program instructions which, when executed by a programmable processing apparatus, cause the processing apparatus to execute a method comprising:

storing at least one reference motion data frame defining a reference motion, each reference motion data frame corresponding to respective first and second reference video frames in a sequence of video frames showing the reference motion and comprising a plurality of optical flow vectors, each optical flow vector corresponding to a respective area segment defined in the first reference video frame and a corresponding area segment defined in the second reference video frame and defining optical flow between the area segment defined in the first reference video frame and the area segment defined in the second reference video frame;

receiving a sequence of video frames to be processed;

processing at least one pair of the received video frames to generate a motion data frame defining motion of a subject between the pair of received video frames, wherein each pair of the received video frames that is processed is processed by:

for each area segment of the reference video frames, determining a corresponding area segment in a first video frame of the pair and a corresponding area segment in a second video frame of the pair;

for each determined pair of corresponding area segments, comparing the area segments and generating an optical flow vector defining optical flow between the area segments; and generating a motion data frame for the pair of received video frames, the motion data frame comprising the optical flow vectors generated for the determined pairs of corresponding area segments;

comparing the at least one reference motion data frame defining the reference motion to the at least one generated motion data frames defining the motion of the subject; and generating a similarity metric for the motion of the subject and the reference motion, wherein:

a sequence of reference motion data frames is stored defining the reference motion;

processing at least one pair of the received video frames to generate a motion data frame defining motion of the subject between the pair of received video frames comprises processing respective pairs of the received video frames to generate a sequence of motion data frames defining motion of the subject in the received sequence of video frames; and comparing the at least one reference motion data frame to the at least one generated motion data frame defining motion of the subject comprises comparing the reference motion data frames to a plurality of the generated motion data frames wherein the plurality of motion data frames which is compared to the reference motion data frames has a number of motion data frames that is equal to the number of reference motion data frames, the comparison being performed by:

comparing each optical flow vector of each motion data frame of the reference motion data frames to a corresponding optical flow vector of a corresponding motion data frame of the generated motion data frames.

* * * * *